United States Patent
Ichikawa et al.

(10) Patent No.: US 7,956,489 B2
(45) Date of Patent: Jun. 7, 2011

(54) POWER SUPPLY SYSTEM AND VEHICLE INCLUDING THE SAME

(75) Inventors: Shinji Ichikawa, Toyota (JP); Tetsuhiro Ishikawa, Toyota (JP); Hiroki Sawada, Toyota (JP); Hichirosai Oyobe, Toyota (JP); Wanleng Ang, Toyota (JP); Hiroshi Yoshida, Anjo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 311 days.

(21) Appl. No.: 12/225,119

(22) PCT Filed: Feb. 16, 2007

(86) PCT No.: PCT/JP2007/053343
§ 371 (c)(1),
(2), (4) Date: Sep. 15, 2008

(87) PCT Pub. No.: WO2007/125673
PCT Pub. Date: Nov. 8, 2007

(65) Prior Publication Data
US 2009/0067202 A1  Mar. 12, 2009

(30) Foreign Application Priority Data

Mar. 31, 2006  (JP) .................................. 2006-099156
Jun. 30, 2006  (JP) .................................. 2006-182124

(51) Int. Cl.
*B60L 1/00* (2006.01)
(52) U.S. Cl. .................................................... 307/10.1
(58) Field of Classification Search .................. 307/10.1
See application file for complete search history.

(56) References Cited

U.S. PATENT DOCUMENTS

| 5,710,699 A * | 1/1998 | King et al. ..................... 363/132 |
| 6,163,135 A | 12/2000 | Nakayama et al. |
| 6,608,396 B2 | 8/2003 | Downer et al. |
| 7,015,676 B2 | 3/2006 | Kohama et al. |
| 2003/0107352 A1 | 6/2003 | Downer et al. |
| 2003/0155814 A1 | 8/2003 | Gronbach |

(Continued)

FOREIGN PATENT DOCUMENTS

CA  2531139 A1  2/2005

(Continued)

OTHER PUBLICATIONS

Di Napoli et al., "Control Strategy for Multiple Input DC-DC Power Converters Devoted to Hybrid Vehicle Propulsion Systems", *Industrial Electronics*, 2002, pp. 1036-1041.

(Continued)

*Primary Examiner* — Michael Rutland Wallis
(74) *Attorney, Agent, or Firm* — Oliff & Berridge, PLC

(57) ABSTRACT

A converter ECU (2) obtains allowable power total value including at least one of discharge allowable power total value ΣWout of discharge allowable power Wout1, Wout2 and charge allowable power total value ΣWin of charge allowable power Win1, Win2. Then, the converter ECU (2) determines which of the allowable power total value and an actual power value is greater, If the actual power value is smaller than the allowable power total value, the converter ECU (2) controls a converter (8-1) such that an input/output voltage value Vh attains a prescribed target voltage value, and at the same time controls a converter (8-2) such that a battery current value Ib2 attains a prescribed target current value.

29 Claims, 19 Drawing Sheets

U.S. PATENT DOCUMENTS

| | | |
|---|---|---|
| 2003/0169001 A1 | 9/2003 | Murakami et al. |
| 2003/0231005 A1 | 12/2003 | Kohama et al. |
| 2006/0113964 A1 | 6/2006 | Ito et al. |

FOREIGN PATENT DOCUMENTS

| | | |
|---|---|---|
| EP | 0 985 570 A2 | 3/2000 |
| FR | 2 691 019 A1 | 11/1993 |
| JP | A-2000-92614 | 3/2000 |
| JP | A-2002-010502 | 1/2002 |
| JP | A-2003-272712 | 9/2003 |
| JP | A-2003-274565 | 9/2003 |
| JP | A-2003-309997 | 10/2003 |
| JP | A-2004-015866 | 1/2004 |
| SU | 491183 | 11/1975 |
| SU | 1741227 A1 | 6/1992 |

OTHER PUBLICATIONS

Di Napoli et al., "Multiple-Input DC-DC Power Converter for Power-Flow Management in Hybrid Vehicles", *Conference Record of the 2002 IEEE Industry Applications Conference*, vol. 1, 2002, pp. 1578-1585.

May 31, 2010 Office Action issued in Korean Patent Application No. 10-2008-7026524 (with translation).

Russian Office Action issued in Russian Patent Application No. 2008143250 on Feb. 9, 2010 (with Translation).

* cited by examiner

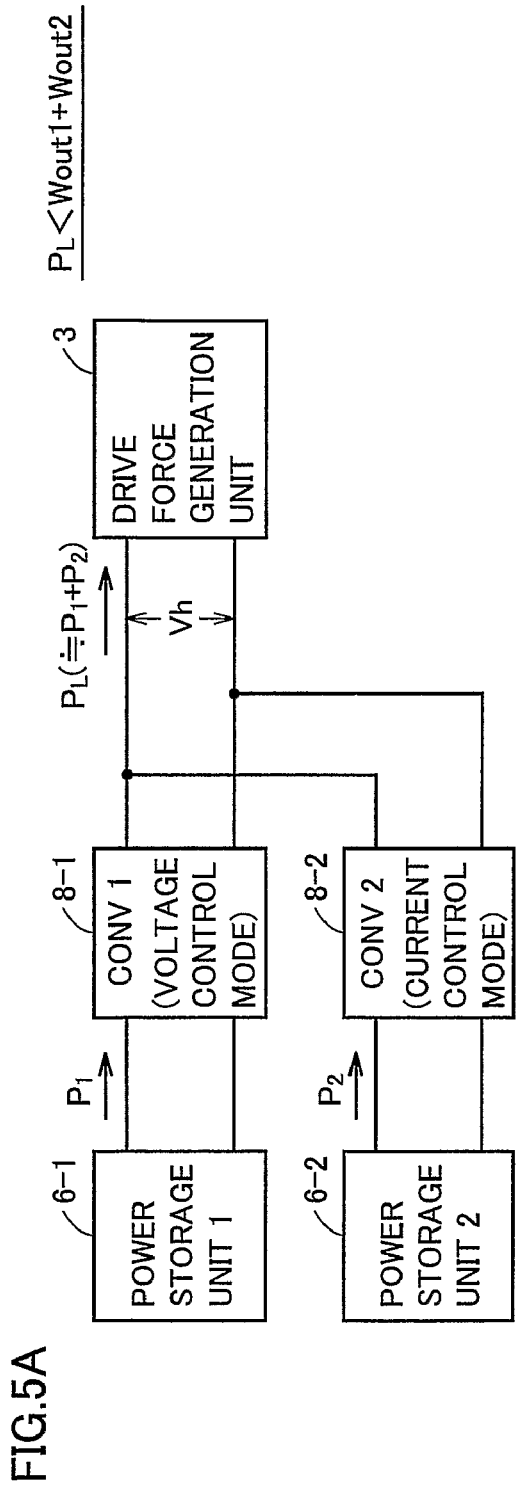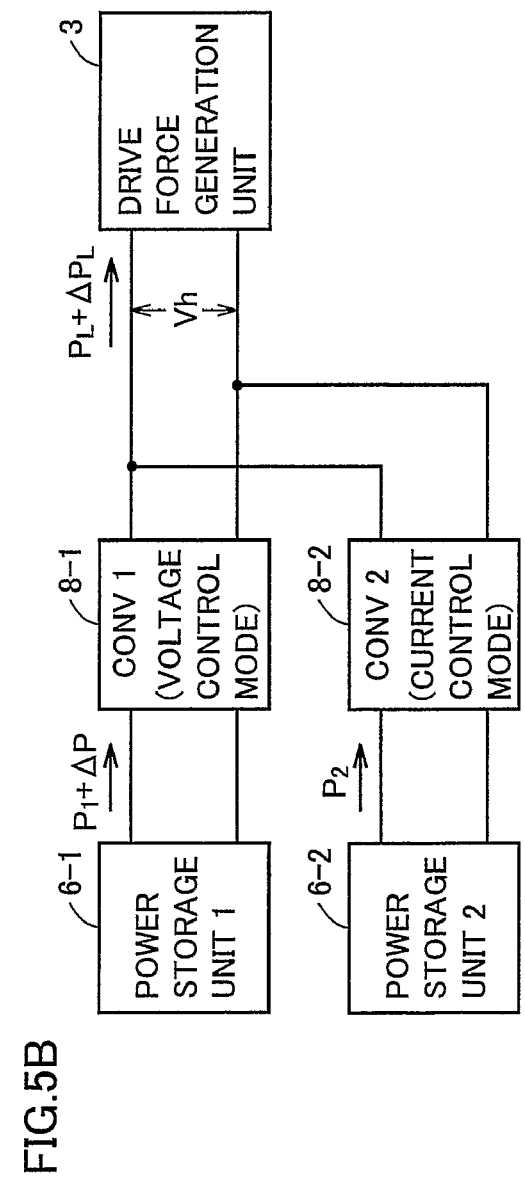
FIG.5A
FIG.5B

POWER SUPPLY SYSTEM AND VEHICLE INCLUDING THE SAME

TECHNICAL FIELD

The present invention relates to a power supply system having a plurality of power storage units and a vehicle including the power supply system, and more particularly to a technique for realizing power management in each power storage unit with high accuracy in accordance with electric power supplied/received to/from a connected load device. In addition, particularly, the present invention relates to a technique for realizing temperature management of a power storage unit while suppressing influence on electric power supplied/received to/from a load device.

BACKGROUND ART

Recently, considering environmental issues, attention has been paid to a vehicle employing a motor as a drive power source, such as an electric vehicle, a hybrid vehicle and a fuel cell vehicle. Such a vehicle includes a power storage unit implemented, for example, by a rechargeable battery or an electric double layer capacitor for supplying electric power to the motor, and converting kinetic energy to electric energy during regenerative braking and storing such electric power.

In such a vehicle employing the motor as the drive power source, in order to enhance acceleration performance and running performance such as travel distance, greater charge/discharge capacity of the power storage unit is desired. Here, a configuration where a plurality of power storage units are mounted has been proposed as a method of increasing the charge/discharge capacity of the power storage unit.

For example, U.S. Pat. No. 6,608,396 discloses a power control system providing desired high DC voltage levels required by a high voltage vehicle traction system. The power control system includes a plurality of power stages for providing DC power to at least one inverter, each stage including a battery and boost/buck DC-DC converter, the power stages wired in parallel, and a controller controlling the plurality of power stages so as to maintain a voltage output to at least one inverter by causing uniform charge/discharge of the batteries of the plurality of power stages.

Meanwhile, as the power storage unit stores electric energy utilizing electrochemical process, the charge/discharge characteristic thereof is susceptible to a temperature. As the temperature is lower, the charge/discharge performance of a general power storage unit is lowered. Accordingly, in order to maintain prescribed charge/discharge performance, temperature management, particularly control of temperature increase, in the power storage unit is important.

For example, Japanese Patent Laying-Open No. 2003-272712 discloses a battery control device capable of preventing electric power that can be input/output to a battery from lowering due to temperature lowering, by efficiently raising a temperature of the battery while avoiding detriments caused by addition of parts. According to this battery control device, if the temperature of the battery is not higher than a prescribed value, charge/discharge of the battery is repeated in accordance with a state of charge of the battery.

Actual full charge capacity often differs between the power storage units even of the same type, depending on variation in manufacturing or degree of deterioration. Accordingly, as in the power control system disclosed in U.S. Pat. No. 6,608,396, even if uniform charge/discharge is carried out based on SOC of each battery, there is a difference in an amount of actually supplied electric charges (charged power). Consequently, a difference is created also in allowable power of the battery. Nevertheless, the power control system disclosed in U.S. Pat. No. 6,608,396 has not considered the allowable power of each battery. Therefore, power requirement in a load device (such as a motor) has not been met.

In addition, since the power control system disclosed in U.S. Pat. No. 6,608,396 is premised on the same fill charge capacity of the battery as designed, combination of a plurality of batteries different in the full charge capacity has not been permitted.

Meanwhile, in the battery control device disclosed in Japanese Patent Laying-Open No. 2003-272712, in order to raise the temperature of the battery, regenerative charging or drive of the generator is prohibited, depending on a state of charge of the battery. Therefore, running performance of the vehicle has been restricted by execution of control for temperature increase in the battery.

DISCLOSURE OF THE INVENTION

The present invention was made to solve such problems. A first object of the present invention is to provide a power supply system capable of power management in each power storage unit with high accuracy while meeting power requirement of a load device. In addition, a second object of the present invention is to provide a power supply system capable of raising a temperature of a power storage unit while suppressing influence on electric power supplied/received to/from a load device.

According to one aspect of the present invention, the present invention is directed to a power supply system including a plurality of power storage units each configured to be capable of charge/discharge. The power supply system according to the present invention includes a power line configured to allow supply/reception of electric power between a load device and the power supply system, and a plurality of voltage conversion units provided between the plurality of power storage units and the power line and each performing a voltage conversion operation between the corresponding power storage unit and the power line. Each of the plurality of voltage conversion units is set to any one of a voltage control mode in which a voltage value of the power line is controlled to attain a voltage target value and a current control mode in which a current value of the corresponding power storage unit is controlled to attain a current target value, to perform the voltage conversion operation. The power supply system according to the present invention further includes actual power value obtaining means for obtaining, on the power line, an actual value of electric power supplied/received to/from the load device, first determination means for determining which of an allowable power total value, representing a total value of allowable power of the plurality of power storage units, and the actual power value, obtained by the actual power value obtaining means, is greater, and first voltage conversion unit control means for setting one of the plurality of voltage conversion units to the voltage control mode and setting remaining voltage conversion unit to the current control mode if the first determination means determines that the actual power value is smaller than the allowable power total value.

According to one aspect of the present invention, when the actual value of electric power supplied/received to/from the load device is smaller than the total value of the allowable power of the power storage units, one voltage conversion unit is controlled such that the voltage value of the power line attains a prescribed voltage target value (voltage control mode), whereas the remaining voltage conversion units are controlled such that the current values of the power storage units attain prescribed current target values respectively (current control mode). Therefore, the current value, that is, charge/discharge power, of the power storage unit corresponding to the voltage conversion unit controlled in the current control mode can be managed with high accuracy. In addition, the voltage conversion unit controlled in the voltage control mode attempts to maintain the voltage value of the power line at the voltage target value. Accordingly, even if the electric power supplied/received to/from the load device fluctuates, the charge/discharge power of the power storage unit connected to the voltage conversion unit is adjusted in accordance with fluctuation in the electric power. Therefore, power requirement of the load device that fluctuates can also be met. Power management of the power storage unit can thus be realized while the power requirement of the load device is met.

Preferably, the power supply system further includes electric power fluctuation estimation means for estimating fluctuation of the electric power supplied/received to/from the load device, and second voltage conversion unit control means for switching the voltage conversion unit, set to the voltage control mode by the first voltage conversion unit control means, to the current control mode when the electric power fluctuation estimation means estimates that electric power fluctuation is smaller than a prescribed value even if the first determination means determines that the actual power value is smaller than the allowable power total value.

Preferably, the power supply system further includes second determination means for determining whether charge/discharge restriction is necessary, based on the allowable power of the plurality of power storage units, and third voltage conversion unit control means for setting the plurality of voltage conversion units to the current control mode if the second determination means determines that charge/discharge restriction is necessary.

Preferably, the power supply system further includes fourth voltage conversion unit control means for setting the plurality of voltage conversion units to the current control mode if the first determination means determines that the actual power value is equal to or larger than the allowable power total value.

Preferably, the current target value in the current control mode is set in accordance with a voltage value of the power storage unit such that the current target value does not exceed the allowable power, for each of the plurality of voltage conversion units.

Preferably, the power supply system further includes third determination means for determining power margin of the allowable power total value, for the actual power value, and fifth voltage conversion unit control means for stopping the voltage conversion operation in the voltage conversion unit corresponding to at least one power storage unit out of the plurality of power storage units, if the third determination means determines, in a control operation by the first voltage conversion unit control means, that the power margin is greater than the allowable power of that at least one power storage unit.

According to another aspect of the present invention, the present invention is directed to a power supply system including a plurality of power storage units each configured to be capable of charge/discharge. The power supply system according to the present invention includes a power line configured to allow supply/reception of electric power between a load device and the power supply system, and a plurality of voltage conversion units provided between the plurality of power storage units and the power line and each performing a voltage conversion operation between corresponding power storage unit and the power line. Each of the plurality of voltage conversion units is set to any one of a voltage control mode in which a voltage value of the power line is controlled to attain a voltage target value and a current control mode in which a current value of the corresponding power storage unit is controlled to attain a current target value, to perform the voltage conversion operation. The power supply system according to the present invention further includes power storage unit temperature obtaining means for obtaining temperatures of the plurality of power storage units, temperature determination means for determining whether each of temperatures of the plurality of power storage units obtained by the power storage unit temperature obtaining means is lower than a corresponding temperature lower limit value, and mode setting means for setting one of the voltage conversion unit, corresponding to the power storage unit of which temperature has been determined by the temperature determination means as lower than the temperature lower limit value, and remaining voltage conversion unit, to the current control mode, and setting another of them to the voltage control mode.

According to another aspect of the present invention, the voltage conversion unit, corresponding to the power storage unit of which temperature has been determined as lower than the temperature lower limit value, and remaining voltage conversion units perform the voltage conversion operation in control modes different from each other. Therefore, the voltage conversion unit operating in the current control mode ensures a prescribed charging/discharging current for raising the temperature of the power storage unit, while the voltage conversion unit operating in the voltage control mode stabilizes the voltage of the power line allowing supply/reception of electric power to/from the load device. In addition, the voltage conversion unit operating in the voltage control mode compensates for fluctuation caused in the electric power supplied/received to/from the load device. The temperature of the power storage unit of which temperature is lower than the temperature lower limit value can thus be raised, while influence on the electric power supplied/received to/from the load device is suppressed.

Preferably, the mode setting means sets the voltage conversion unit, corresponding to the power storage unit of which temperature has been determined by the temperature determination means as lower than the temperature lower limit value, to the current control mode, and sets remaining voltage conversion unit to the voltage control mode.

Preferably, the mode setting means sets solely the voltage conversion unit corresponding to the power storage unit of higher priority to the current control mode, if it is determined that the temperature of all of the plurality of power storage units is lower than the corresponding temperature lower limit value.

Preferably, the current target value in the current control mode is set in accordance with the obtained temperature of the power storage unit, for each of the plurality of voltage conversion units.

Further preferably, the current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

Alternatively, preferably, the mode setting means sets the voltage conversion unit, corresponding to the power storage unit of which temperature has been determined by the temperature determination means as lower than the temperature lower limit value, to the voltage control mode, and sets remaining voltage conversion unit to the current control mode.

According to yet another aspect of the present invention, the present invention is directed to a method of controlling any power supply system described above.

According to still another aspect of the present invention, the present invention is directed to a vehicle including any power supply system described above and a drive force generation unit generating drive force by receiving electric power supplied from the power supply system.

According to still another aspect of the present invention, the present invention is directed to a method of controlling any vehicle described above.

According to the present invention, a power supply system capable of power management in each power storage unit with high accuracy while meeting power requirement of the load device in accordance with the electric power supplied/received to/from the load device and a vehicle including the power supply system can be realized. In addition, according to the present invention, a power supply system capable of raising a temperature of a power storage unit while suppressing influence on electric power supplied/received to/from a load device and a vehicle including the power supply system can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B illustrate power allocation when the converters according to the first embodiment of the present invention operate in a voltage control mode and a current control mode respectively.

BEST MODES FOR CARRYING OUT THE INVENTION

Figure 1:
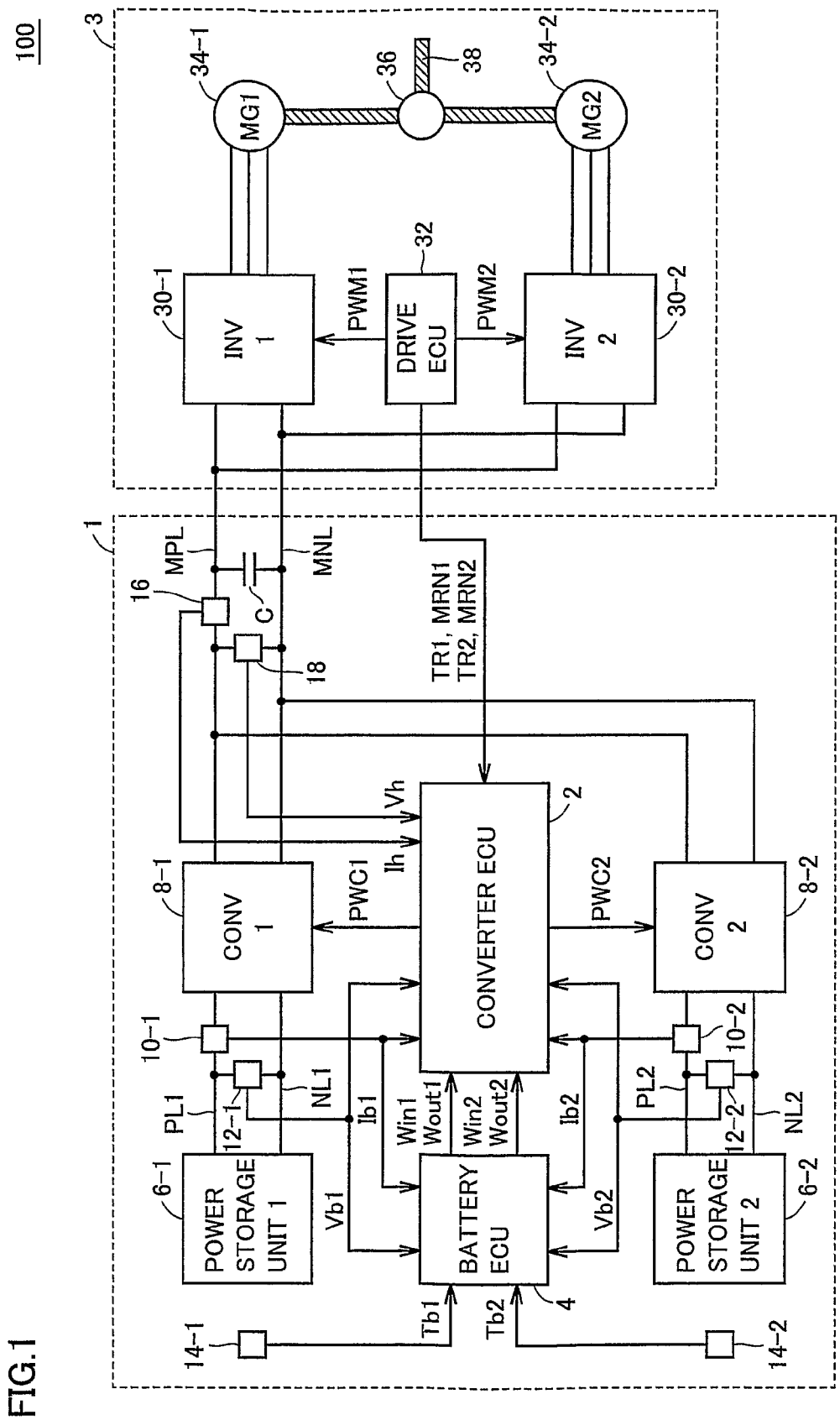
FIG. 1 is a schematic configuration diagram showing a substantial part of a vehicle including a power supply system according to the first embodiment of the present invention.

An embodiment of the present invention will be described in detail with reference to the drawings. The same or corresponding elements in the drawings have the same reference characters allotted, and therefore detailed description thereof will not be repeated.

First Embodiment

FIG. 1 illustrates a first embodiment in which a drive force generation unit 3 generating drive force of a vehicle 100 serves as a load device. Vehicle 100 runs by transmitting to drive wheels (not shown), drive force generated from the electric power supplied from a power supply system 1 to drive force generation unit 3. In addition, during regeneration, vehicle 100 causes drive force generation unit 3 to generate electric power from kinetic energy and recovers the electric power in power supply system 1.

In the first embodiment, power supply system 1 including two power storage units will be described as an example of a plurality of power storage units. Power supply system 1 supplies/receives DC power to/from drive force generation unit 3 through a main positive bus MPL and a main negative bus MNL. In the description below, the electric power supplied from power supply system 1 to drive force generation unit 3 is also referred to as "drive power", and the electric power supplied from drive force generation unit 3 to power supply system 1 is also referred to as "regenerative power".

Drive force generation unit 3 includes a first inverter (INV1) 30-1, a second inverter (INV2) 30-2, a first motor-generator (MG1) 34-1, a second motor-generator (MG2) 34-2, and a drive ECU (Electronic Control Unit) 32.

Inverters 30-1, 30-2 are connected in parallel to main positive bus MPL and main negative bus MNL, and supply/receive electric power to/from power supply system 1. That is, inverters 30-1, 30-2 convert drive power (DC power) received through main positive bus MPL and main negative bus M to AC power and supply the AC power to motor-generators 34-1, 34-2 respectively, whereas inverters 30-1, 30-2 convert AC power generated by motor-generators 34-1, 34-2 to DC power and supply the resultant DC power as the regenerative power to power supply system 1. For example, inverters 30-1, 30-2 are constituted of a bridge circuit including switching elements of three phases, and generate three-phase AC power by performing a switching (circuit opening/closing) operation in response to switching instructions PWM1, PWM2 received from drive ECU 32.

Motor-generators 34-1, 34-2 are configured to be able to generate rotational drive force by receiving AC power supplied from inverters 30-1, 30-2 respectively and to be able to generate AC power by receiving external rotational drive force. For example, motor-generators 34-1, 34-2 are implemented by a three-phase AC electric rotating machine including a rotor having permanent magnets embedded, Motor-generators 34-1, 34-2 are coupled to a power split device 36, so as to transmit the generated drive force to wheels (not shown) via a drive shaft 38.

If drive force generation unit 3 is applied to a hybrid vehicle, motor-generators 34-1, 34-2 are coupled also to an engine (not shown) through power split device 36 or drive shaft 38. Then, drive ECU 32 controls drive force generation unit 3 such that an optimal ratio between the drive force generated by the engine and the drive force generated by motor-generators 34-1, 34-2 is attained. If drive force generation unit 3 is applied to such a hybrid vehicle, motor-generator 34-1 may serve solely as the motor, while motor-generator 34-2 may serve solely as the generator.

Drive ECU 32 executes a program stored in advance, so as to calculate torque target values TR1, TR2 and rotation speed target values MRN1, MRN2 of motor-generators 34-1, 34-2, based on a signal transmitted from each sensor (not shown), a running state, variation in an accelerator pedal position, a stored map, or the like. Then, drive ECU 32 generates switching instructions PWM1, PWM2 and controls inverters 30-1, 30-2, such that generated torque and the speed of motor-generators 34-1, 34-2 attain torque target values TR1, TR2 and rotation speed target values MRN1, MRN2 respectively. In addition, drive ECU 32 outputs calculated torque target values TR1, TR2 and rotation speed target values MRN1, MRN2 to power supply system 1. It is noted here that, if torque target values TR1, TR2 in the case that motor-generators 34-1, 34-2 generate rotational drive force are positive values, torque target values TR1, TR2 are negative values in the case of regenerative braking.

Meanwhile, power supply system 1 includes a smoothing capacitor C, an input/output current detection unit 16, an input/output voltage detection unit 18, a first converter (CONV1) 8-1, a second converter (CONV2) 8-2, a first power storage unit 6-1, a second power storage unit 6-2, charging/discharging current detection units 10-1, 10-2, charge/discharge voltage detection units 12-1, 12-2, temperature detection units 14-1, 14-2, a converter ECU 2, and a battery ECU 4.

Smoothing capacitor C is connected between main positive bus MPL and main negative bus MNL, and reduces a fluctuation component contained in drive power output from converters 8-1, 8-2 and regenerative power supplied from drive force generation unit 3.

Input/output current detection unit 16 is inserted in main positive bus MPL in series, detects an input/output current value Ih of the drive power and the regenerative power supplied/received to/from drive force generation unit 3, and outputs the result of detection to converter ECU 2.

Input/output voltage detection unit 18 is connected between main positive bus MPL and main negative bus MNL, detects an input/output voltage value Vh of the drive power and the regenerative power supplied/received to/from drive force generation unit 3, and outputs the result of detection to converter ECU 2.

Converters 8-1, 8-2 are provided between main positive bus MPL, main negative bus MNL and respective power storage units 6-1, 6-2, and perform power conversion operation between respective power storage units 6-1, 6-2 and main positive bus MPL, main negative bus MNL. More specifically, converters 8-1, 8-2 boost the discharge power from power storage units 6-1, 6-2 to a prescribed voltage and supply the resultant power as the drive power, while converters 8-1, 8-2 buck the regenerative power supplied from drive force generation unit 3 to a prescribed voltage and charge power storage units 6-1, 6-2. For example, converters 8-1, 8-2 are implemented by a boost/buck chopper circuit.

Power storage units 6-1, 6-2 are connected in parallel to main positive bus MPL and main negative bus MNL with converters 8-1, 8-2 being interposed respectively. For example, power storage units 6-1, 6-2 are implemented by a rechargeable battery configured to be capable of charge/discharge, such as a nickel metal hydride battery or a lithium-ion battery, or by an electric double layer capacitor.

Charging/discharging current detection units 10-1, 10-2 are inserted in the power lines connecting power storage units 6-1, 6-2 to converters 8-1, 8-2 respectively, detect charging/discharging current values Ib1, Ib2 caused by charge/discharge of power storage units 6-1, 6-2 respectively, and output the result of detection to battery ECU 4.

Charge/discharge voltage detection units 12-1, 12-2 are connected between the power lines connecting power storage units 6-1, 6-2 to converters 8-1, 8-2 respectively, detect charge/discharge voltage values Vb1, Vb2 of power storage units 6-1, 6-2 respectively, and output the result of detection to battery ECU 4.

Temperature detection units 14-1, 14-2 are arranged in the proximity of battery cells and the like constituting power storage units 6-1, 6-2 respectively, detect power storage unit temperatures Tb1, Tb2 which represent internal temperatures of power storage units 6-1, 6-2, and output the result of detection to battery ECU 4. It is noted that temperature detection units 14-1, 14-2 may be configured to output a representative value obtained for example by averaging processing, based on the result of detection by a plurality of detection elements arranged in correspondence with a plurality of battery cells constituting power storage units 6-1, 6-2 respectively.

Battery ECU 4 calculates SOC1, SOC2 (State of Charge; hereinafter simply also referred to as "SOC") in respective power storage units 6-1, 6-2, based on charging/discharging current values Ib1, Ib2 received from charging/discharging current detection units 10-1, 10-2, charge/discharge voltage values Vb1, Vb2 received from charge/discharge voltage detection units 12-1, 12-2, and power storage unit temperatures Tb1, Tb2 received from temperature detection units 14-1, 14-2. Various well-known techniques may be employed for calculating SOC of power storage units 6-1, 6-2. For example, battery ECU 4 derives SOC by adding provisional SOC calculated from an open-circuit voltage value and corrective SOC calculated from an accumulated value of the charging/discharging current values. More specifically, battery ECU 4 calculates the open-circuit voltage value of power storage units 6-1, 6-2 based on charging/discharging current values Ib1, Ib2 and charge/discharge voltage values Vb1, Vb2 at each time point, and applies the open-circuit voltage value to a reference charge/discharge characteristic indicating relation between the open-circuit voltage value and SOC in a reference state of power storage units 6-1, 6-2 that has experimentally been measured in advance, thereby calculating provisional SOC of power storage units 6-1, 6-2. Then, battery ECU 4 calculates corrective SOC by accumulating charging/discharging current values Ib1, Ib2, and adds the corrective SOC to provisional SOC, thus deriving SOC.

In addition, battery ECU 4 derives allowable power (charge allowable power Win1, Win2 and discharge allowable power Wout1, Wout2) based on derived respective SOC1, SOC2 of power storage units 6-1, 6-2. Charge allowable power Win1, Win2 and discharge allowable power Wout1, Wout2 refer to restriction values of charge power and discharge power for a short period of time at each time point, that are defined by the limit in terms of chemical reaction.

Therefore, battery ECU 4 stores a map of the allowable power experimentally obtained in advance in which SOC and power storage unit temperature Tb are defined as parameters, and derives the allowable power at each time point based on calculated SOC1, SOC2 and power storage unit temperatures Tb1, Tb2. It is noted that the map defining the allowable power may include a parameter other than the SOC and the power storage unit temperature, such as degree of deterioration of the power storage unit.

Then, battery ECU 4 outputs derived charge allowable power Win1, Win2 and discharge allowable power Wout1, Wout2 of power storage units 6-1, 6-2 to converter ECU 2.

Converter ECU 2 generates switching instructions PWC1, PWC2 and controls converters 8-1, 8-2 in accordance with a control configuration which will be described later, based on input/output current value Ih received from input/output current detection unit 16, input/output voltage value Vh received from input/output voltage detection unit 18, charging/discharging current values Ib1, Ib2 received from charging/discharging current detection units 10-1, 10-2, charge/discharge voltage values Vb1, Vb2 received from charge/discharge voltage detection units 12-1, 12-2, Win1, Win2, Wout1, Wout2 received from battery ECU 4, and torque target values TR1, TR2 and rotation speed target values MRN1, MRN2 received from drive ECU 32.

Specifically, converter ECU 2 obtains the allowable power total value including at least one of a discharge allowable power total value ΣWout of discharge allowable power Wout1, Wout2 and a charge allowable power total value ΣWin of charge allowable power Win1, Win2. In addition, converter ECU 2 obtains a value of actual power (drive power or regenerative power) supplied/received to/from drive force generation unit 3, based on a product of input/output current value Ih and input/output voltage value Vh. Then, converter ECU 2 determines which of the allowable power total value (discharge allowable power total value ΣWout or charge allowable power total value ΣWin) and the actual power value is greater. If it is determined that the actual power value is smaller than the allowable power total value, converter ECU 2 generates switching instruction PWC1 and controls converter 8-1 such that input/output voltage value Vh attains a prescribed voltage target value (hereinafter, also referred to as "voltage control mode"). At the same time, converter ECU 2 generates switching instruction PWC2 and controls converter 8-2 such that charging/discharging current value Ib2 attains a prescribed current target value (hereinafter, also referred to as "current control mode").

In addition, converter ECU 2 estimates fluctuation of electric power (drive power or regenerative power) supplied/received to/from drive force generation unit 3, based on change over time of torque target values TR1, TR2 and rotation speed target values MRN1, MRN2. If fluctuation of the electric power is estimated as smaller than a prescribed value although the actual power value has been determined as smaller than the allowable power total value, converter ECU 2 generates switching instruction PWC1 and controls also converter 8-1 such that charging/discharging current value Ib1 attains the prescribed current target value (current control mode). Namely, converter ECU 2 switches the mode of converter 8-1 from the voltage control mode to the current control mode.

Moreover, converter ECU 2 determines whether charge/discharge restriction is necessary or not, based on the allowable power total value (discharge allowable power total value ΣWout or charge allowable power total value ΣWin). Specifically, if discharge allowable power total value ΣWout is smaller than a discharge threshold value, converter ECU 2 determines that discharge restriction is necessary. If charge allowable power total value ΣWin is smaller than a charge threshold value, converter ECU 2 determines that charge restriction is necessary. If it is determined that charge/discharge restriction is necessary, converter ECU 2 generates switching instructions PWC1, PWC2 and controls converters 8-1, 8-2 such that charging/discharging current values Ib1, Ib2 attain the prescribed current target values respectively (current control mode).

Further, converter ECU 2 determines power margin of the allowable power total value, for the actual value (discharge allowable power total value ΣWout or charge allowable power total value ΣWin). If it is determined that the power margin exceeds discharge allowable power Wout2 or charge allowable power Win2 of power storage unit 6-2, converter ECU 2 changes switching instruction PWC2 to zero, and stops the voltage conversion operation in converter 8-2 (hereinafter, also referred to as "control stop mode").

As described above, converter ECU 2 controls converters 8-1, 8-2 optimally, in accordance with a state of charge of power storage units 6-1, 6-2 and the actual value of electric power supplied/received to/from drive force generation unit 3.

In the first embodiment, drive force generation unit 3 corresponds to the "load device", main positive bus MPL and main negative bus MNL correspond to the "power line", and converters 8-1, 8-2 correspond to the "plurality of voltage conversion units." In addition, converter ECU 2 implements the "actual power value obtaining means," the "first determination means", the "second determination means", the "third determination means", the "first voltage conversion unit control means," the "second voltage conversion unit control means," the "third voltage conversion unit control means," the "fourth voltage conversion unit control means," the "fifth voltage conversion unit control means," and the "electric power fluctuation estimation means." Moreover, converter ECU 2 corresponds to the "control device".

Figure 2:
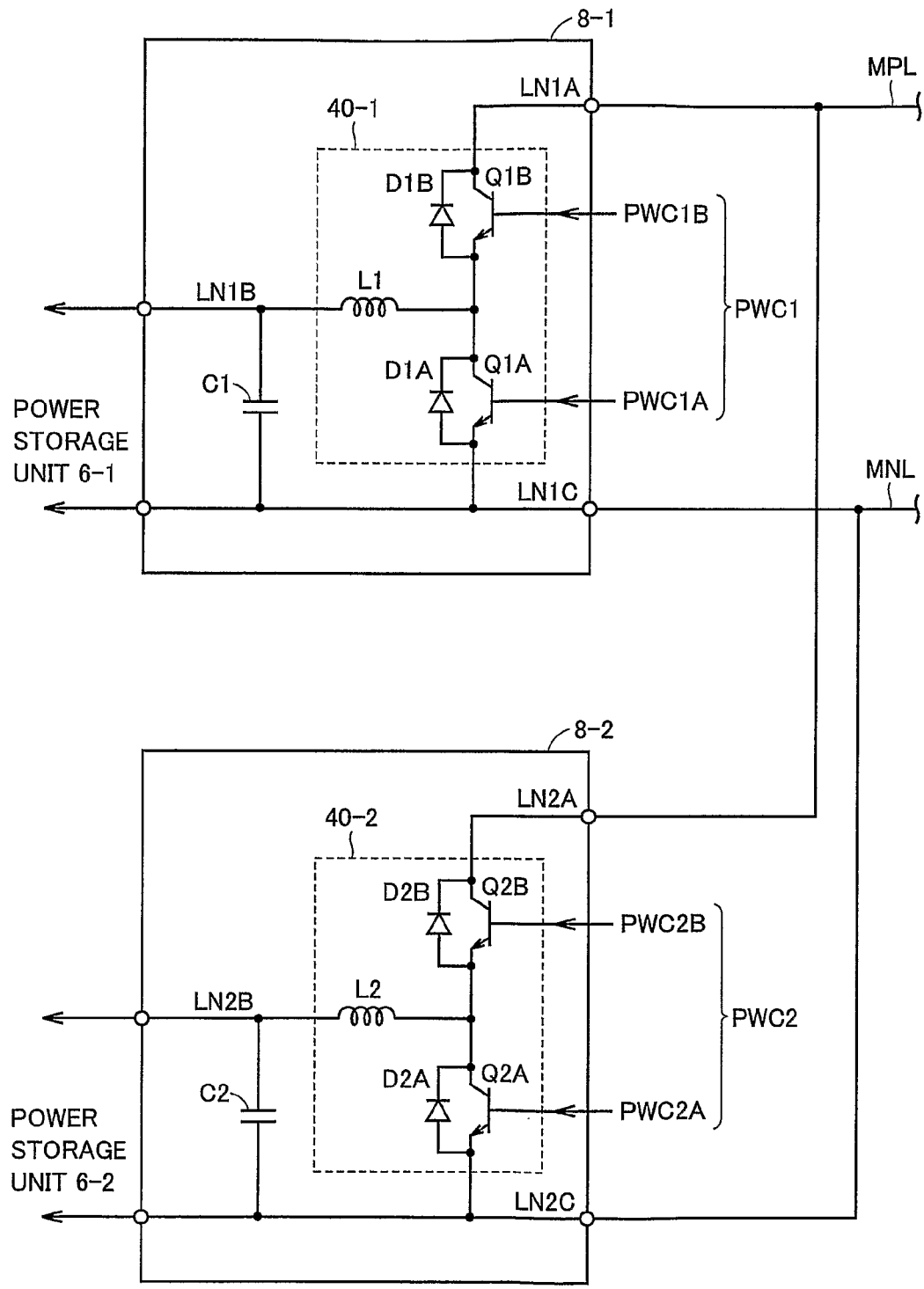
FIG. 2 is a schematic configuration diagram of a converter according to the first embodiment of the present invention.

Referring to FIG. 2, converter 8-1 is constituted of a chopper circuit 40-1 and a smoothing capacitor C1.

Chopper circuit 40-1, during discharge, boosts the DC power (drive power) received from power storage unit 6-1 in response to switching instruction PWC1 from converter ECU 2 (FIG. 1), while chopper circuit 40-1, during charging, bucks the DC power (regenerative power) received through main positive bus MPL and main negative bus MNL. In addition, chopper circuit 40-1 includes a positive bus LN1A, a negative bus LN1C, a line LNLB, transistors Q1A, Q1B representing a switching element, diodes D1A, D1B, and an inductor L1.

Positive bus LN1A has one end connected to a collector of transistor Q1B and the other end connected to main positive bus MPL. In addition, negative bus LN1C has one end connected to a negative side of power storage unit 6-1 and the other end connected to main negative bus MNL.

Transistors Q1A, Q1B are connected in series between negative bus LN1C and positive bus LN1A. Transistor Q1A has an emitter connected to negative bus LN1C and transistor Q1B has the collector connected to positive bus LN1A. In addition, diodes D1A, D1B allowing current flow from the emitter side to the collector side are connected between the collector and the emitter of transistors Q1A, Q1B respectively. Further, inductor L1 is connected to a connection point of transistor Q1A and transistor Q1B.

Line LN1B has one end connected to the positive side of power storage unit 6-1 and the other end connected to inductor L1.

Smoothing capacitor C1 is connected between line LN1B and negative bus LN1C, and reduces the AC component contained in the DC voltage across line LN1B and negative bus LN1C.

The voltage conversion operation (boost operation and buck operation) of converter 8-1 will be described hereinafter. In the boost operation, converter ECU 2 (FIG. 1) maintains transistor Q1B at the ON state, and turns on/off transistor Q1A at a prescribed duty ratio. During the ON period of transistor Q1A, a discharging current flows from power storage unit 6-1 to main positive bus MPL sequentially through line LN1B, inductor L1, transistor Q1B, and positive bus LN1A. At the same time, a pump current flows from power storage unit 6-1 sequentially through line LN1B, inductor L1, transistor Q1A, and negative bus LN1C. Inductor L1 accumulates electromagnetic energy by means of the pump current. Successively, when transistor Q1A makes transition from the ON state to the OFF state, inductor L1 superimposes the accumulated electromagnetic energy onto the discharging current. Consequently, the average voltage of the DC power supplied from converter 8-1 to main positive bus MPL and main negative bus MNL is boosted by a voltage corresponding to the electromagnetic energy accumulated in inductor L1 in accordance with the duty ratio.

On the other hand, in the buck operation, converter ECU 2 turns on/off transistor Q1B at a prescribed duty ratio, and maintains transistor Q1A at the OFF state. During the ON period of transistor Q1B, the charging current flows from main positive bus MPL to power storage unit 6-1 sequentially through positive bus LN1A, transistor Q1B, inductor L1, and line LN1B. Successively, when transistor Q1B makes transition from the ON state to the OFF state, inductor L1 generates such magnetic flux as preventing current variation. Accordingly, the charging current continues to flow sequentially through diode D1A, inductor L1 and line LN1B. Meanwhile, from a viewpoint of electric energy, it is solely during the ON period of transistor Q1B that the DC power is supplied through main positive bus MPL and main negative bus MNL. Therefore, if the charging current is maintained constant (if inductance of inductor L1 is sufficiently large), the average voltage of the DC power supplied from converter 8-1 to power storage unit 6-1 is set to a value obtained by multiplying the DC voltage across main positive bus MPL and main negative bus MNL by the duty ratio.

In order to control such a voltage conversion operation of converter 8-1, converter ECU 2 generates switching instruction PWC1 consisting of a switching instruction PWC1A controlling on/off of transistor Q1A and a switching instruction PWC1B controlling on/off of transistor Q1B.

As the configuration and the operation of converter 8-2 are also similar to those of converter 8-1 described above, detailed description will not be repeated.

The control configuration of converter ECU 2 will be described hereinafter in further detail. Though converter ECU 2 carries out similar control for any of drive power and regenerative power, for the sake of facilitated understanding, the control configuration for the drive power will exemplarily be described in the first embodiment.

Figure 3:
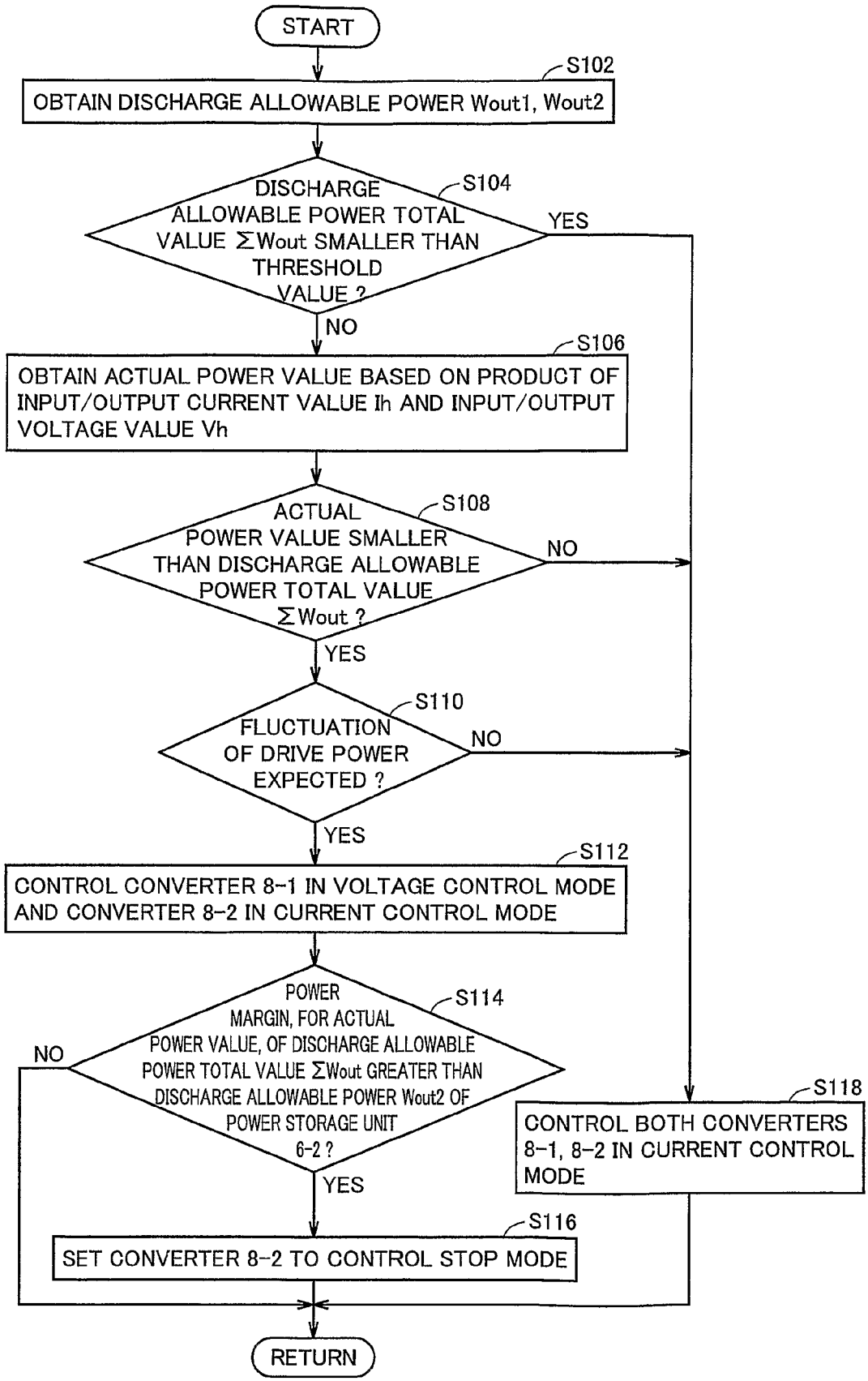
FIG. 3 is a flowchart showing a control configuration for realizing generation of a switching instruction (boost operation) in a converter ECU according to the first embodiment of the present invention.

Referring to FIG. 3, converter ECU 2 obtains discharge allowable power Wout1, Wout2 from battery ECU 4 (step S102). Then, converter ECU 2 determines whether discharge allowable power total value $\Sigma$Wout is smaller than the threshold value or not (step S104). Namely, converter ECU 2 determines whether discharge restriction for power storage units 6-1, 6-2 is necessary or not.

If discharge allowable power value $\Sigma$Wout is not smaller than the threshold value (NO in step S104), converter ECU 2 obtains the actual power value (drive power) based on a product of input/output current value Ih and input/output voltage value Vh (step S106). Then, converter ECU 2 determines whether the actual power value is smaller than discharge allowable power total value $\Sigma$Wout or not (step S108).

If the actual power value is smaller than discharge allowable power total value $\Sigma$Wout (YES in step S108), converter ECU 2 determines whether fluctuation of the drive power is expected or not (step S110). For example, converter ECU 2 determines whether an amount of change over time in torque target values TR1, TR2 and rotation speed target values MRN1, MRN2 is equal to or greater than the threshold value. If fluctuation of the drive power is expected (YES in step S110), converter ECU 2 controls converter 8-1 in the voltage control mode and controls converter 8-2 in the current control mode (step S112). In addition, converter ECU 2 determines whether power margin of discharge allowable power total value $\Sigma$Wout, for the actual power value is greater than discharge allowable power Wout2 of power storage unit 6-2 (step S114), Namely, converter ECU 2 determines whether or not the actual power value is smaller than discharge allowable power Wout1 of power storage unit 6-1 and whether or not power storage unit 6-1 alone can satisfy power requirement.

If the power margin of discharge allowable power total value $\Sigma$Wout, for the actual power value is greater than discharge allowable power Wout2 of power storage unit 6-2 (YES in step S114), converter ECU 2 sets converter 8-2 to the control stop mode (step S116). Then, converter ECU 2 returns to the initial processing.

On the other hand, if the power margin of discharge allowable power total value $\Sigma$Wout, for the actual power value is not greater than discharge allowable power Wout2 of power storage unit 6-2 (NO in step S114), converter ECU 2 returns to the initial processing.

If discharge allowable power total value $\Sigma$Wout is smaller than the threshold value (YES in step S104), if the actual power value is not smaller than discharge allowable power total value $\Sigma$Wout (NO in step S108), and if fluctuation of the drive power is not expected (NO in step S110), converter ECU 2 controls both converters 8-1, 8-2 in the current control mode (step S118). Then, converter ECU 2 returns to the initial processing.

As described above, converter ECU 2 switches the control mode for converters 8-1, 8-2, in accordance with the drive power and discharge allowable power Wout1, Wout2.

Figure 4:
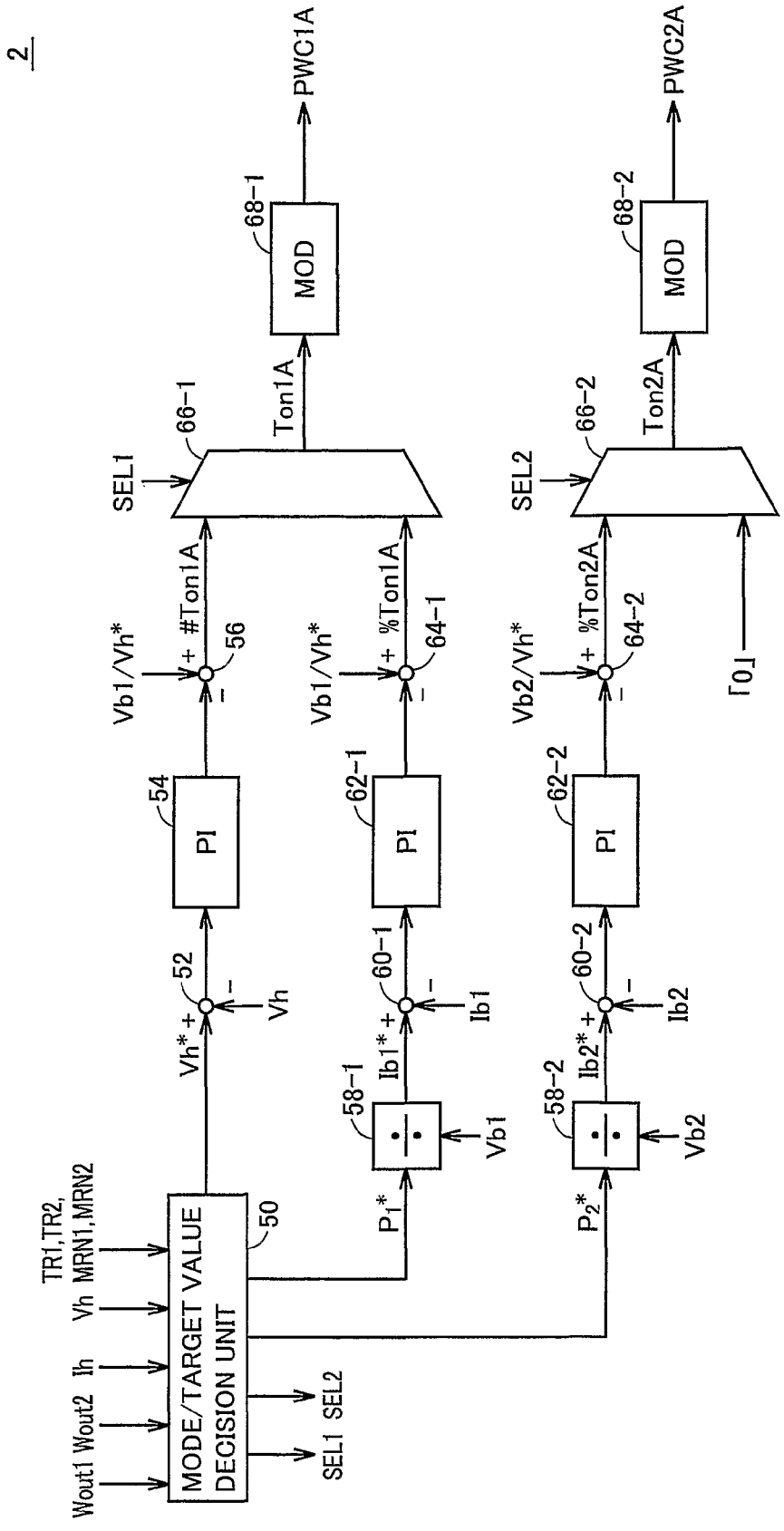
FIG. 4 is a block diagram for realizing generation of a switching instruction (boost operation) in the converter ECU according to the first embodiment of the present invention.

Referring to FIG. 4, converter ECU 2 includes a mode/target value decision unit 50, subtraction units 52, 56, 60-1, 60-2, 64-1, 64-2, proportional control units (PI) 54, 62-1, 62-2, division units 58-1, 58-2, selection units 66-1, 66-2, and modulation units (MOD) 68-1, 68-2.

Mode/target value decision unit 50 decides the control mode in converter 8-1 (the voltage control mode or the current control mode) and the control mode in converter 8-2 (the current control mode or the control stop mode), based on discharge allowable power Wout1, Wout2, torque target values TR1, TR2 and rotation speed target values MRN1, MRN2. Then, mode/target value decision unit 50 outputs mode selection instructions SEL1, SEL2 to selection units 66-1, 66-2, in accordance with each decided mode.

In addition, mode/target value decision unit 50 decides a voltage target value and/or a power target value, in accordance with each decided mode. Specifically, if the voltage control mode is decided for converter 8-1, mode/target value decision unit 50 calculates a required voltage of drive force generation unit 3 (FIG. 1) based on torque target values TR1, TR2 and rotation speed target values MRN1, MRN2, and decides a voltage target value Vh*. If the current control mode is decided for converter 8-1, mode/target value decision unit 50 decides a power target value P1* in a range not exceeding discharge allowable power Wout 1, to be allocated to converter 8-1 out of the actual power value. In addition, during a period in which converter 8-1 is set to the current control mode, mode/target value decision unit 50 decides a power target value P2* of converter 8-2 corresponding to an electric power value obtained by subtracting power target value P1* of converter 8-1 from the actual power value. On the other hand, during a period in which converter 8-1 is set to the voltage control mode, mode/target value decision unit 50 decides power target value P2* in a range not exceeding discharge allowable power Wout 2, to be allocated to converter 8-2 out of the actual power value.

It is noted that respective power target values P1*, P2* allocated to converters 8-1, 8-2 out of the actual power value may be decided arbitrarily, so long as the power target values are in a range not exceeding Wout1, Wout2 respectively.

Voltage target value Vh* and power target values P1*, P2* thus decided by mode/target value decision unit 50 are output to subtraction unit 52 and division units 58-1, 58-2 respectively.

Subtraction unit 52 operates voltage deviation based on the difference between voltage target value Vh* and input/output voltage value Vh, and outputs the result to proportional control unit (PI) 54. Proportional control unit 54 includes at least a proportional element (P) and an integral element (I), and outputs an instruction signal in accordance with the input voltage deviation to subtraction unit 56.

Subtraction unit 56 inverts a sign of the instruction signal output from proportional control unit 54, adds thereto charge/discharge voltage value Vb1/voltage target value Vh* of power storage unit 6-1 (reciprocal of theoretical boost ratio in converter 8-1), and outputs a duty instruction (voltage control mode) #Ton1A. Duty instruction (voltage control mode) #Ton1A is a control instruction defining on-duty of transistor Q1A (FIG. 3) of converter 8-1 in the voltage control mode.

Meanwhile, division unit 58-1 divides power target value P1* by charge/discharge voltage value Vb1 of power storage unit 6-1, so as to operate current target value Ib1* of power storage unit 6-1, and outputs the result to subtraction unit 60-1.

Subtraction unit 60-1 operates current deviation based on the difference between current target value Ib1* and charging/discharging current value Ib1, and outputs the result to proportional control unit (PI) 62-1. Proportional control unit 62-1 includes at least a proportional element and an integral element as in the case of proportional control unit 54 described above, and outputs an instruction signal in accordance with the input current deviation to subtraction unit 64-1.

Subtraction unit 64-1 inverts a sign of the instruction signal output from proportional control unit (PI) 62-1, adds thereto charge/discharge voltage value Vb1/voltage target value Vh* of power storage unit 6-1 (reciprocal of theoretical boost ratio in converter 8-1), and outputs a duty instruction (current control mode) %Ton1A. Duty instruction (current control mode) %Ton1A is a control instruction defining on-duty of transistor Q1A (FIG. 3) of converter 8-1 in the current control mode.

In addition, receiving duty instruction (voltage control mode) #Ton1A and duty instruction (current control mode) %Ton1A, selection unit 66-1 selects any one of them based on mode selection instruction SEL1 from mode/target value decision unit 50, and outputs the selected one as duty instruction Ton1A to modulation unit 68-1.

Modulation unit 68-1 compares a carrier wave generated by a not-shown oscillation unit with duty instruction Ton1A, generates switching instruction PWC1A, and controls converter 8-1.

In addition, division unit 58-2 divides power target value P2* by charge/discharge voltage value Vb2 of power storage unit 6-2, so as to operate current target value Ib2* of power storage unit 6-2, and outputs the result to subtraction unit 60-2.

Subtraction unit 60-2 operates current deviation based on the difference between current target value Ib2* and charging/discharging current value Ib2, and outputs the result to proportional control unit (PI) 62-2. Proportional control unit 62-2 includes at least a proportional element and an integral element as in the case of proportional control unit 54 described above, and outputs an instruction signal in accordance with the input current deviation to subtraction unit 64-2.

Subtraction unit 64-2 inverts a sign of the instruction signal output from proportional control unit 62-2, adds thereto charge/discharge voltage value Vb2/voltage target value Vh* of power storage unit 6-2 (reciprocal of theoretical boost ratio in converter 8-2), and outputs a duty instruction (current control mode) %Ton2A. Duty instruction (current control mode) %Ton2A is a control instruction defining on-duty of transistor Q2A (FIG. 3) of converter 8-2 in the current control mode.

In addition, receiving duty instruction (current control mode) %Ton2A and value "0", selection unit 66-2 selects any one of them based on mode selection instruction SEL2 from mode/target value decision unit 50, and outputs the selected one as duty instruction Ton2A to modulation unit 68-2. It is noted that the value "0" is used for maintaining duty instruction Ton2A at zero, that is, for maintaining the OFF state of transistor Q2A of converter 8-2, when the control stop mode is selected.

Modulation unit 68-2 compares a carrier wave generated by a not-shown oscillation unit with duty instruction Ton2A, generates switching instruction PWC2A, and controls converter 8-2.

As described above, as to converter 8-1, converter ECU 2 selects any one of a voltage control loop for input/output voltage value Vh and a current control loop for charging/discharging current value Ib1, and generates switching instruction PWC1A for controlling the boost operation. Meanwhile, as to converter 8-2, converter ECU 2 selects any one of a current control loop for charging/discharging current value Ib2 and "0" (control stop), and generates switching instruction PWC2A for controlling the boost operation.

It is noted that, though converter ECU 2 may be configured to include the circuit corresponding to each block, in many cases, the functions in the block diagram shown in FIG. 4 are attained by execution by converter ECU 2 of a process routine in accordance with a program that has been set in advance.

The control configuration and the block diagram for regenerative power are similar to the flowchart shown in FIG. 3 and the block diagram shown in FIG. 4 except that charge allowable power Win1, Win2 and charge allowable power total value ΣWin are used instead of discharge allowable power Wout1, Wout2 and discharge allowable power total value ΣWout.

Electric power supply/reception in each control mode will be described hereinafter.

FIG. 5A shows an example in which drive force generation unit 3 consumes substantially constant drive power PL.

FIG. 5B shows an example in which drive power of drive force generation unit 3 varies (ΔPL).

Referring to FIG. 5A, in the case that drive force generation unit 3 consumes prescribed drive power PL (PL<Wout1+Wout2), drive power P1, P2 are allocated to converters 8-1, 8-2 respectively. Here, converter 8-2 is controlled such that charging/discharging current value Ib1 attains current target value Ib1* (FIG. 4) described above (current control mode). Therefore, supplied drive power P2 is set to power target value P2* described above (FIG. 4). Meanwhile, converter 8-1 is controlled such that input/output voltage value Vh attains voltage target value Vh* (FIG. 4) described above (voltage control mode). Here, if drive power PL consumed by drive force generation unit 3 is substantially constant, drive power P1 supplied by converter 8-1 can simultaneously be controlled by controlling power target value P2* for converter 8-2. Namely, as relation of drive power P1=drive power PL−drive power P2 is satisfied, by appropriately setting power target value P2*(current target value Ib1*) in accordance with drive power PL at each time point, power management not only of converter 8-2 but also of converter 8-1 can be achieved with high accuracy.

Referring to FIG. 5B, if the drive power consumed by drive force generation unit 3 fluctuates to PL+ΔPL, the drive power corresponding to such fluctuation is allocated to converter 8-1, and therefore fluctuation does not affect power management for converter 8-2. In addition, as converter 8-1 is controlled to maintain input/output voltage value Vh to voltage target value Vh*, input/output voltage value Vh can also be maintained constant, regardless of variation in the drive power consumed by drive force generation unit 3.

If variation ΔPL in the drive power is negative (decrease in the drive power) and its absolute value is greater than drive power P1 of converter 8-1 (P2>PL+ΔPL), converter 8-1 operates such that electric power comparable to the difference between drive power P2 supplied from converter 8-2 and the electric power consumed by drive force generation unit 3 (PL+ΔPL) is recovered and stored in power storage unit 6-1 (buck operation).

Figure 6A:
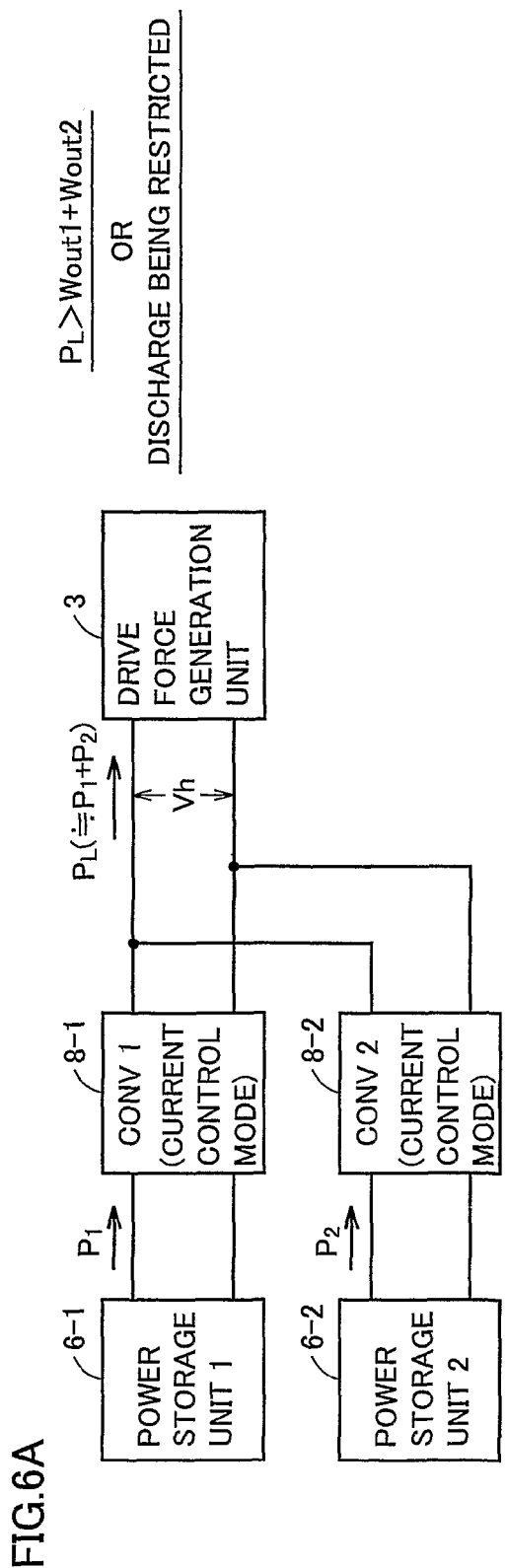
FIGS. 6A and 6B illustrate power allocation when both converters according to the first embodiment of the present invention operate in the current control mode.

FIG. 6A shows an example in which drive force generation unit 3 consumes substantially constant drive power PL.

Figure 6B:
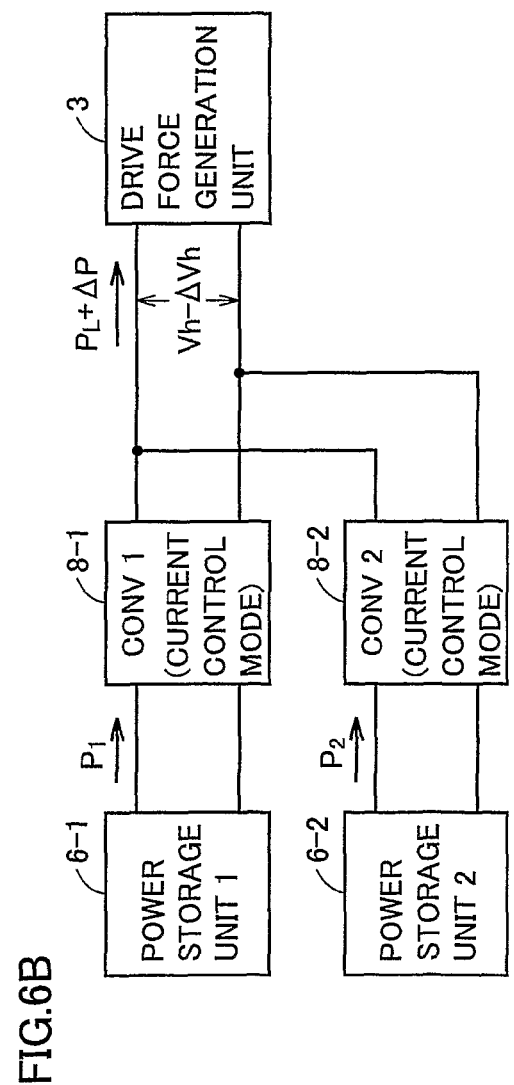

FIG. 6B shows an example in which drive power of drive force generation unit 3 varies (ΔPL).

Referring to FIG. 6A, if drive force generation unit 3 consumes drive power PL greater than discharge allowable power total value ΣWout (=Wout1+Wout2) or if it is determined that discharge is restricted because of discharge allowable power total value ΣWout smaller than the discharge threshold value, drive power P1, P2 in a range limited by discharge allowable power Wout1, Wout2 are allocated to converters 8-1, 8-2 respectively. Namely, converters 8-1, 8-2 are controlled such that charging/discharging current values Ib1, Ib2 are set to current target values Ib1*, Ib2* (FIG. 4) that are decided based on power target values P1*, P2* (FIG. 4) in a range limited by discharge allowable power Wout1, Wout2 respectively (current control mode).

Referring to FIG. 6B, if the drive power required in drive force generation unit 3 fluctuates to PL+ΔPL, the drive power from power storage units 6-1, 6-2 is restricted within a range limited by discharge allowable power Wout1, Wout2 respectively, and therefore, over discharge of power storage units 6-1, 6-2 can be suppressed. Excessive deterioration or the like of power storage units 6-1, 6-2 can thus be avoided.

As imbalance in the electric power occurs between the electric power supply by converters 8-1, 8-2 and the drive power required in drive force generation unit 3, input/output voltage value Vh may lower to (Vh−ΔVh). In such a case, drive ECU 32 (FIG. 1) or the like restricts the generated drive force so as to suppress excessive consumption of the drive power.

Figure 7:
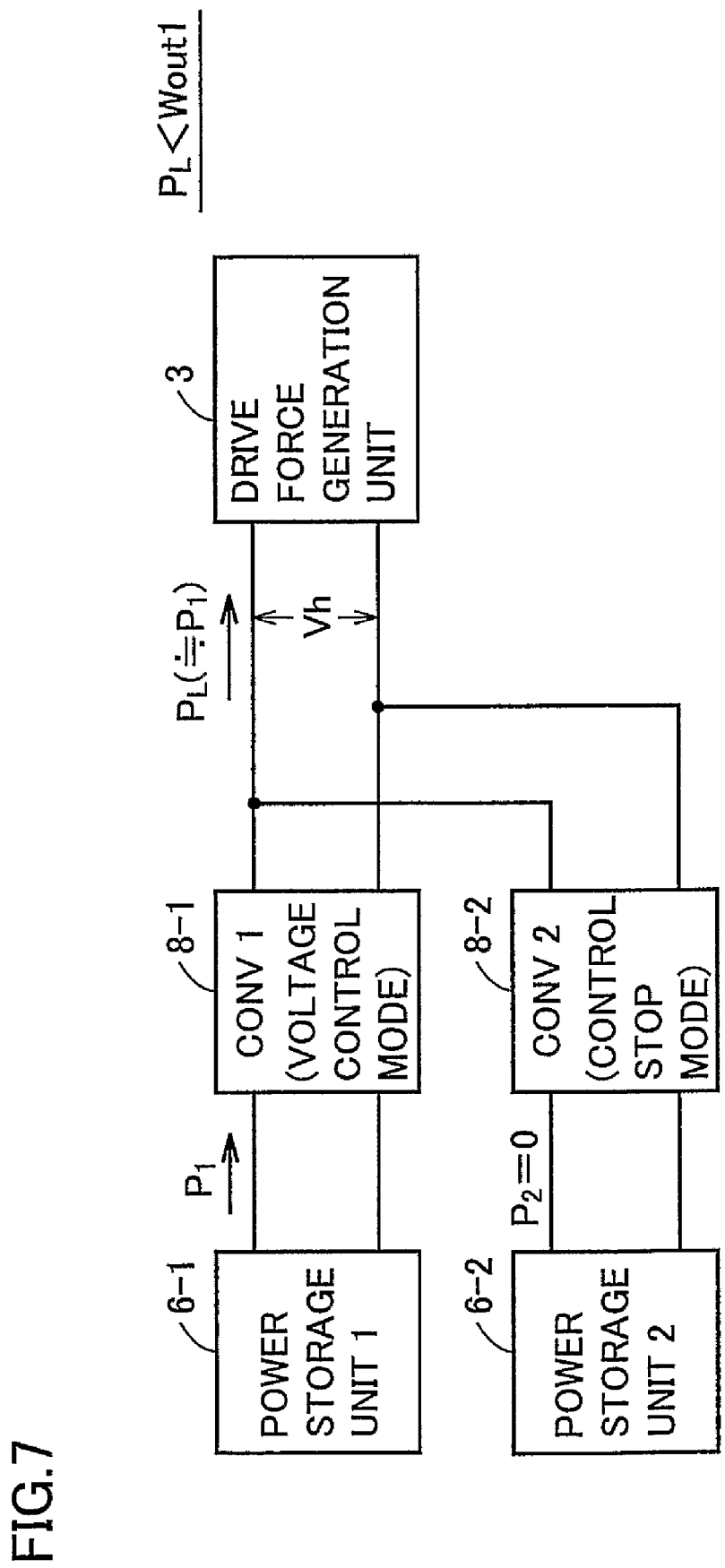
FIG. 7 illustrates power allocation when one of the converters according to the first embodiment of the present invention stops a voltage conversion operation.

Referring to FIG. 7, if drive power PL required in drive force generation unit 3 is smaller than discharge allowable power Wout1 of power storage unit 6-1 in the case shown in FIG. 5, converter ECU 2 stops the voltage conversion operation of converter 8-2 (control stop mode). Then, drive power P2 from power storage unit 6-2 is set to zero, and conversion loss such as switching loss in converter 8-2 can be suppressed. Meanwhile, power storage unit 6-1 and converter 8-1 should supply entire drive power PL required in drive force generation unit 3.

Thus, converter 8-1 can maintain input/output voltage value Vh to voltage target value Vh* (FIG. 4), and energy efficiency as a whole can be improved by suppressing conversion loss due to stop of the voltage conversion operation of converter 8-2.

According to the first embodiment of the present invention, if the actual value of electric power supplied/received to/from the drive force generation unit is smaller than the total value of the allowable power of the power storage unit, the first converter is controlled in the voltage control mode such that the input/output voltage value attains a prescribed voltage target value, while the second converter is controlled in the current control mode such that the charging/discharging current values of the second power storage unit attain the prescribed current target values respectively. Therefore, the current value of the second power storage unit connected to the second converter, that is, the charge/discharge power of the second power storage unit, can be managed with high accuracy. In addition, the first converter attempts to maintain the input/output voltage value to the voltage target value. Accordingly, even if the electric power supplied/received to/from the drive force generation unit fluctuates, the charge/discharge power of the first power storage unit connected to the first converter can be adjusted in accordance with fluctuation of the electric power. Therefore, the power requirement of the drive force generation unit that fluctuates can also be met. Both of power management of the second power storage unit and electric power supply/reception in accordance with the power requirement of the drive force generation unit can thus be achieved. Therefore, the power supply system capable of power management in the power storage unit with high accuracy in accordance with the electric power supplied/received to/from the drive force generation unit can be realized.

In addition, according to the first embodiment of the present invention, fluctuation of electric power supplied/received to/from the drive force generation unit (drive power or regenerative power) is estimated based on change over time of the torque target value and the rotation speed target value from the drive ECU. Then, if it is determined that fluctuation of the electric power is small, the first and second converters are controlled in the current control mode. Thus, if fluctuation of the charge/discharge power of the first and second power storage units is estimated as small, power management of each of the first and second power storage units can be realized with high accuracy.

Moreover, according to the first embodiment of the present invention, whether charge/discharge restriction is necessary or not is determined based on the total value of the allowable power of the power storage unit. If it is determined that charge/discharge restriction is necessary, the first and second converters are controlled in the current control mode. Thus, if over discharge or overcharging of the first and second power storage units is likely, power management of each power storage unit is performed by restricting the charging/discharging current, thereby reliably avoiding over discharge or overcharging.

Further, according to the first embodiment of the present invention, power margin of the power storage unit, with respect to the actual power value of the allowable power total value, is determined. If it is determined that power margin is greater than the allowable power of the second power storage unit, the voltage conversion operation of the second converter is stopped. Thus, conversion loss such as switching loss in the second converter can be suppressed and efficiency as a whole can be improved.

(Variation)

The present invention is applicable also to a power supply system having three or more power storage units, in addition to the power supply system having two power storage units described above.

Figure 8:
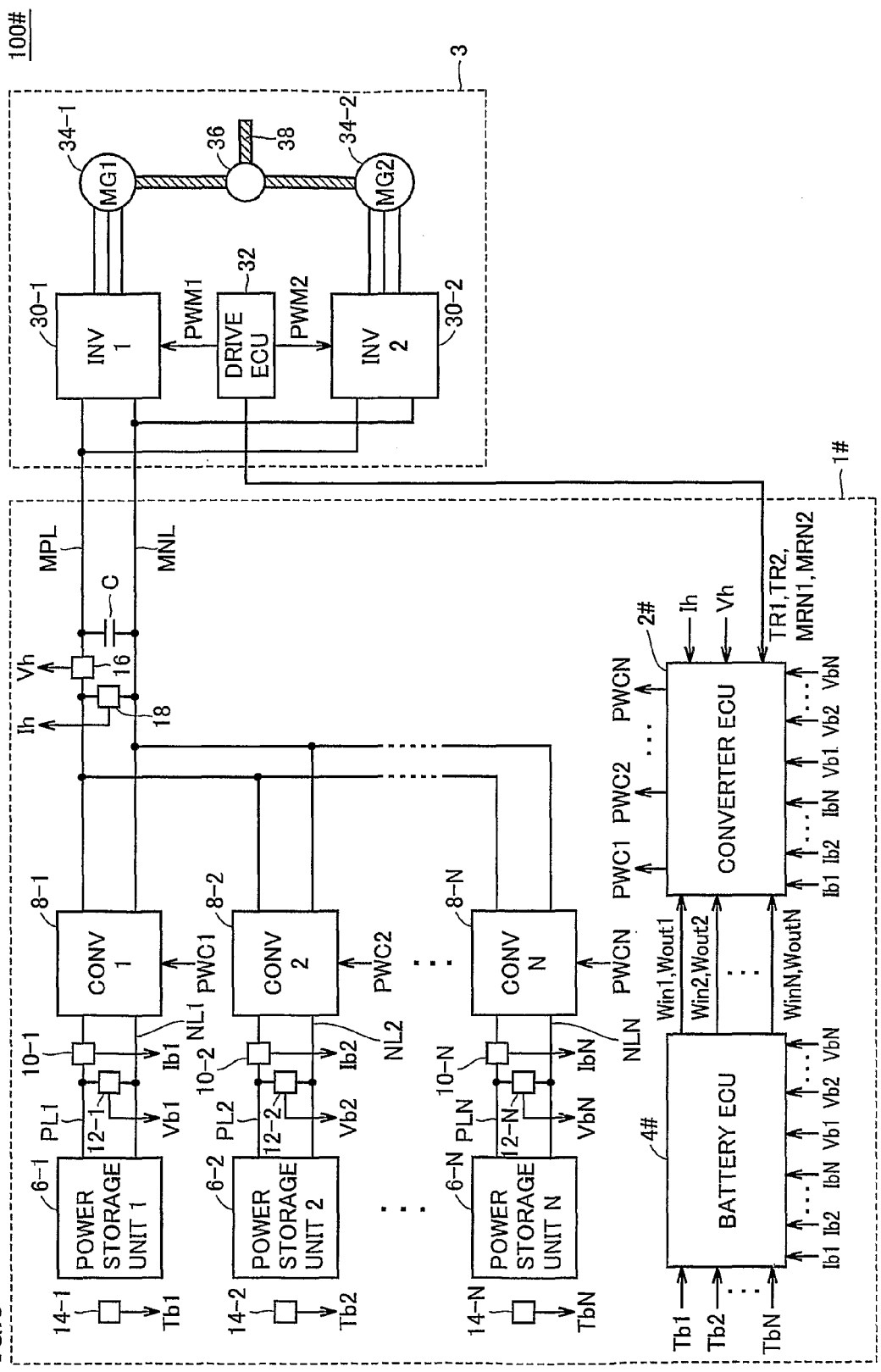
FIG. 8 is a schematic configuration diagram showing a substantial part of a vehicle including a power supply system according to a variation of the first embodiment of the present invention.

Referring to FIG. 8, as a vehicle 100# includes a power supply system 1# arranged instead of power supply system 1 in vehicle 100 shown in FIG. 1, detailed description of drive force generation unit 3 will not be repeated. In the variation of the first embodiment, power supply system 1# including N power storage units will be described.

Power supply system 1# includes converters 8-1 to 8-N, power storage units 6-1 to 6-N, charging/discharging current detection units 10-1 to 10-N, charge/discharge voltage detection units 12-1 to 12-N, and temperature detection units 14-1 to 14-N arranged instead of converters 8-1, 8-1, power storage units 6-1, 6-2, charging/discharging current detection units 10-1, 10-2, charge/discharge voltage detection units 12-1, 12-2, and temperature detection units 14-1, 14-2, and further includes a converter ECU 2# and a battery ECU 4# arranged instead of converter ECU 2 and battery ECU 4 in power supply system 1 shown in FIG. 1.

Power storage units 6-1 to 6-N are connected in parallel to main positive bus MPL and main negative bus MNL with converters 8-1 to 8-N being interposed respectively. Charging/discharging current detection units 10-1 to 10-N, charge/discharge voltage detection units 12-1 to 12-N, and temperature detection units 14-1 to 14-N are arranged in correspondence with power storage units 6-1 to 6-N respectively.

Battery ECU 4# calculates charged states SOC1 to SOCN in respective power storage units 6-1 to 6-N, based on charging/discharging current values Ib1 to IbN received from charging/discharging current detection units 10-1 to 10-N, charge/discharge voltage values Vb1 to VbN received from charge/discharge voltage detection units 12-1 to 12-N, and power storage unit temperatures Tb1 to TbN received from temperature detection units 14-1 to 14-N. Then, battery ECU 4# derives allowable power (charge allowable power Win1 to WinN and discharge allowable power Wout1 to WoutN) based on derived respective SOC1 to SOCN of respective power storage units 6-1 to 6-N. In addition, battery ECU 4# outputs SOC1 to SOCN, charge allowable power Win1 to WinN and discharge allowable power Wout1 to WoutN of power storage units 6-1 to 6-N to converter ECU 2#.

Converter ECU 2# generates switching instructions PWC1 to PWCN and controls converters 8-1 to 8-N, based on input/output current value Ih, input/output voltage value Vh, charging/discharging current values Ib1 to IbN, charge/discharge voltage values Vb1 to VbN, charge allowable power Wout1 to WoutN, discharge allowable power Win1 to WinN, and torque target values TR1, TR2 and rotation speed target values MRN1, MRN2, respectively.

Specifically, converter ECU 2# obtains the allowable power total value including discharge allowable power total value ΣWout of discharge allowable power Wout1 to WoutN and charge allowable power total value ΣWin of charge allowable power Win1 to WinN. In addition, converter ECU 2# obtains the value of the actual power supplied/received to/from drive force generation unit 3 (drive power or regenerative power), based on a product of input/output current value Ih and input/output voltage value Vh. Then, converter ECU 2# determines which of the allowable power total value (discharge allowable power total value ΣWout or charge allowable power total value ΣWin) and the actual power value is greater. If it is determined that the actual power value is smaller than the allowable power total value, converter ECU 2# generates switching instruction PWC1 and controls converter 8-1 such that input/output voltage value Vh attains a prescribed voltage target value (voltage control mode). At the same time, converter ECU 2# generates switching instructions PWC2 to PWCN and controls converters 8-2 to 8-N such that charging/discharging current values Ib2 to IbN attain prescribed current target values respectively (current control mode).

In addition, converter ECU 2# estimates fluctuation of electric power supplied/received to/from drive force generation unit 3 (drive power or regenerative power), based on change over time of torque target values TR1, TR2 and rotation speed target values MRN1, MRN2. If the actual power value is determined as smaller than the allowable power total value (discharge allowable power total value ΣWout or charge allowable power total value ΣWin) and fluctuation of the electric power is estimated as smaller than a prescribed value, in addition to converters 8-2 to 8-N, converter ECU 2# generates switching instruction PWC1 and controls converter 8-1 such that charging/discharging current value Ib1 attains the prescribed current target value (current control mode). Namely, converter ECU 2# switches the mode of converter 8-1 from the voltage control mode to the current control mode.

Moreover, converter ECU 2# determines whether charge/discharge restriction is necessary or not, based on the allowable power total value (discharge allowable power total value ΣWout or charge allowable power total value ΣWin). If it is determined that charge/discharge restriction is necessary, converter ECU 2# generates switching instructions PWC1 to PWCN and controls converters 8-1 to 8-N such that charging/discharging current values Ib1 to IbN attain prescribed current target values respectively (current control mode).

Further, converter ECU 2# determines power margin of the allowable power total value (discharge allowable power total value ΣWout or charge allowable power total value ΣWin), for the actual power value. If it is determined that power margin exceeds at least one of discharge allowable power Wout2 to WoutN or charge allowable power Win2 to WinN of power storage units 6-2 to 6-N, converter ECU 2# changes the switching instruction to the converter connected to the power storage unit corresponding to that allowable power to zero, and stops the voltage conversion operation in that converter (control stop mode).

As the variation is otherwise the same as the first embodiment described above, detailed description will not be repeated.

In the variation of the first embodiment of the present invention, drive force generation unit 3 corresponds to the "load device", main positive bus MPL and main negative bus MNL correspond to the "power line", and converters 8-1 to 8-N correspond to the "plurality of voltage conversion units." In addition, converter ECU 2# implements the "actual power value obtaining means," the "allowable power obtaining means," the "first determination means," the "second determination means," the "third determination means," the "first voltage conversion unit control means," the "second voltage conversion unit control means," the "third voltage conversion unit control means," the fourth voltage conversion unit control means," and the "electric power fluctuation estimation means." Moreover, converter ECU 2# corresponds to the "control device".

In the following, a control configuration in converter ECU 2# will be described in further detail. Though converter ECU 2# carries out similar control for any of drive power and regenerative power, the control configuration for the drive power will exemplarily be described, as in the first embodiment above.

Figure 9:
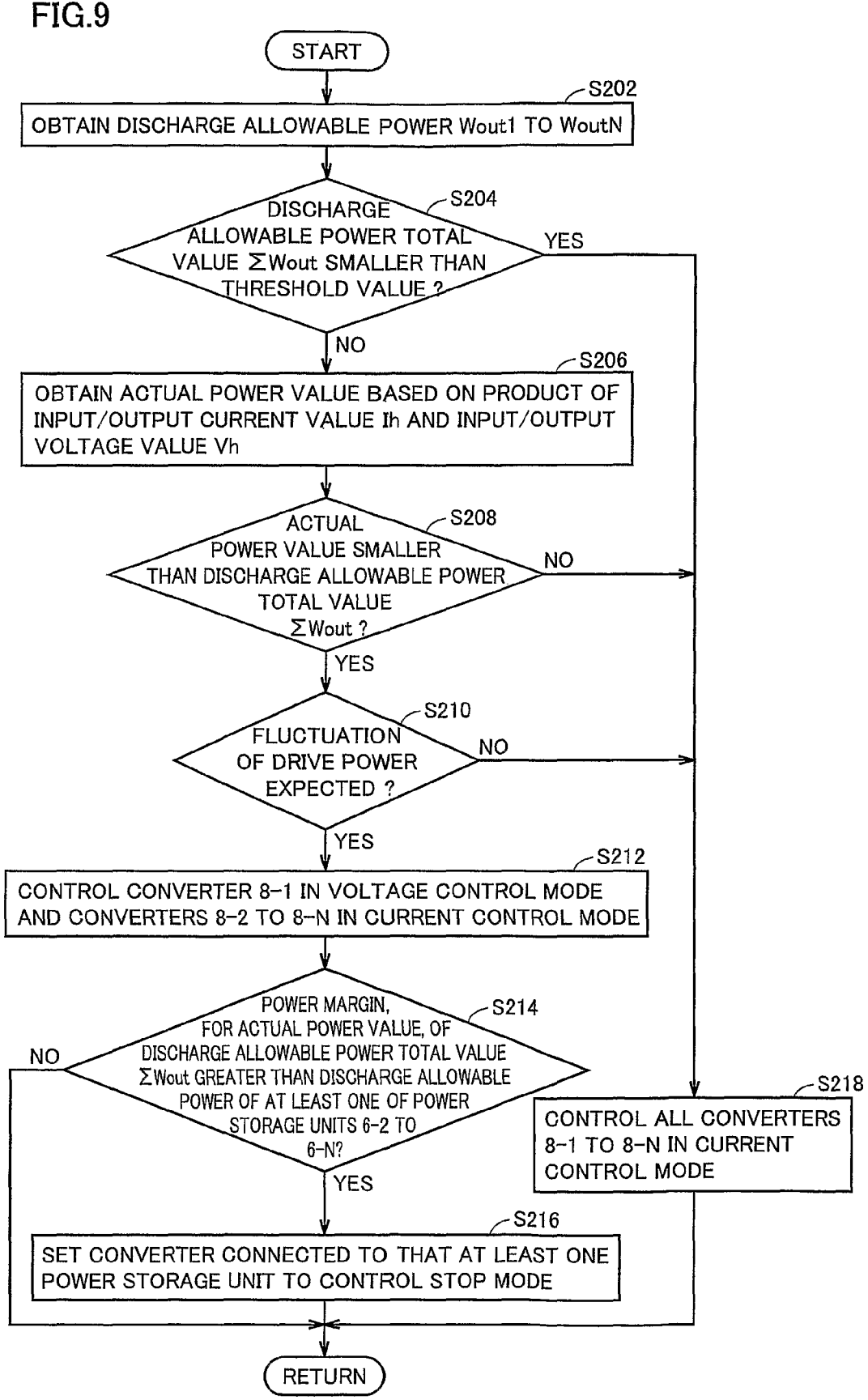
FIG. 9 is a flowchart showing a control configuration for realizing generation of a switching instruction (boost operation) in a converter ECU according to the variation of the first embodiment of the present invention.

Referring to FIG. 9, converter ECU 2# obtains discharge allowable power Wout1 to WoutN from battery ECU 4# (step S202). Then, converter ECU 2# determines whether discharge allowable power total value ΣWout is smaller than the threshold value or not (step S204). Namely, converter ECU 2# determines whether discharge restriction for power storage units 6-1 to 6-N is necessary or not.

If discharge allowable power total value ΣWout is not smaller than the threshold value (NO in step S204), converter ECU 2# obtains the actual power value (drive power) based on a product of input/output current value Ih and input/output voltage value Vh (step S206). Then, converter ECU 2# determines whether the actual power value is smaller than discharge allowable power total value ΣWout or not (step S208).

If the actual power value is smaller than discharge allowable power total value ΣWout (YES in step S268), converter ECU 2# determines whether fluctuation of the drive power is expected or not (step S210). If fluctuation of the drive power is expected (YES in step S210), converter ECU 2# controls converter 8-1 in the voltage control mode and controls converters 8-2 to 8-N in the current control mode (step S212). In addition, converter ECU 2# determines whether power margin of discharge allowable power total value ΣWout, for the actual power value is greater than discharge allowable power Wout of at least one of power storage units 6-2 to 6-N (step S214). Namely, converter ECU 2# determines whether remaining power storage units can satisfy the power requirement if at least one power storage unit out of power storage units 6-2 to 6-N is excluded.

If the power margin of discharge allowable power total value ΣWout, for the actual power value is greater than discharge allowable power, Wout of at least one of power storage units 6-2 to 6-N (YES in step S214), converter ECU 2# sets the converter connected to that at least one power storage unit to the control stop mode (step S216). Then, converter ECU 2# returns to the initial processing.

On the other hand, if the power margin of discharge allowable power total value ΣWout, for the actual power value is not greater than discharge allowable power Wout of any of power storage units 6-2 to 6-N (NO in step S214), converter ECU 2# returns to the initial processing.

If discharge allowable power total value ΣWout is smaller than the threshold value (YES in step S204), if the actual power value is not smaller than discharge allowable power total value ΣWout (NO in step S208), and if fluctuation of the drive power is not expected (NO in step S210), converter ECU 2# controls all converters 8-1 to 8-N in the current control mode (step S218). Then, converter ECU 2# returns to the initial processing.

As described above, converter ECU 2# switches the control mode for converters 8-1 to 8-N, in accordance with the drive power and discharge allowable power Wout1 to WoutN. It is noted that various methods of selecting a converter, for which the control stop mode should be set in step S214 described above, are possible. For example, a converter having a small absolute value for discharge allowable power Wout may be stopped preferentially. With such a method, as a greater number of converters can be stopped, conversion loss can further be suppressed.

Figure 10:
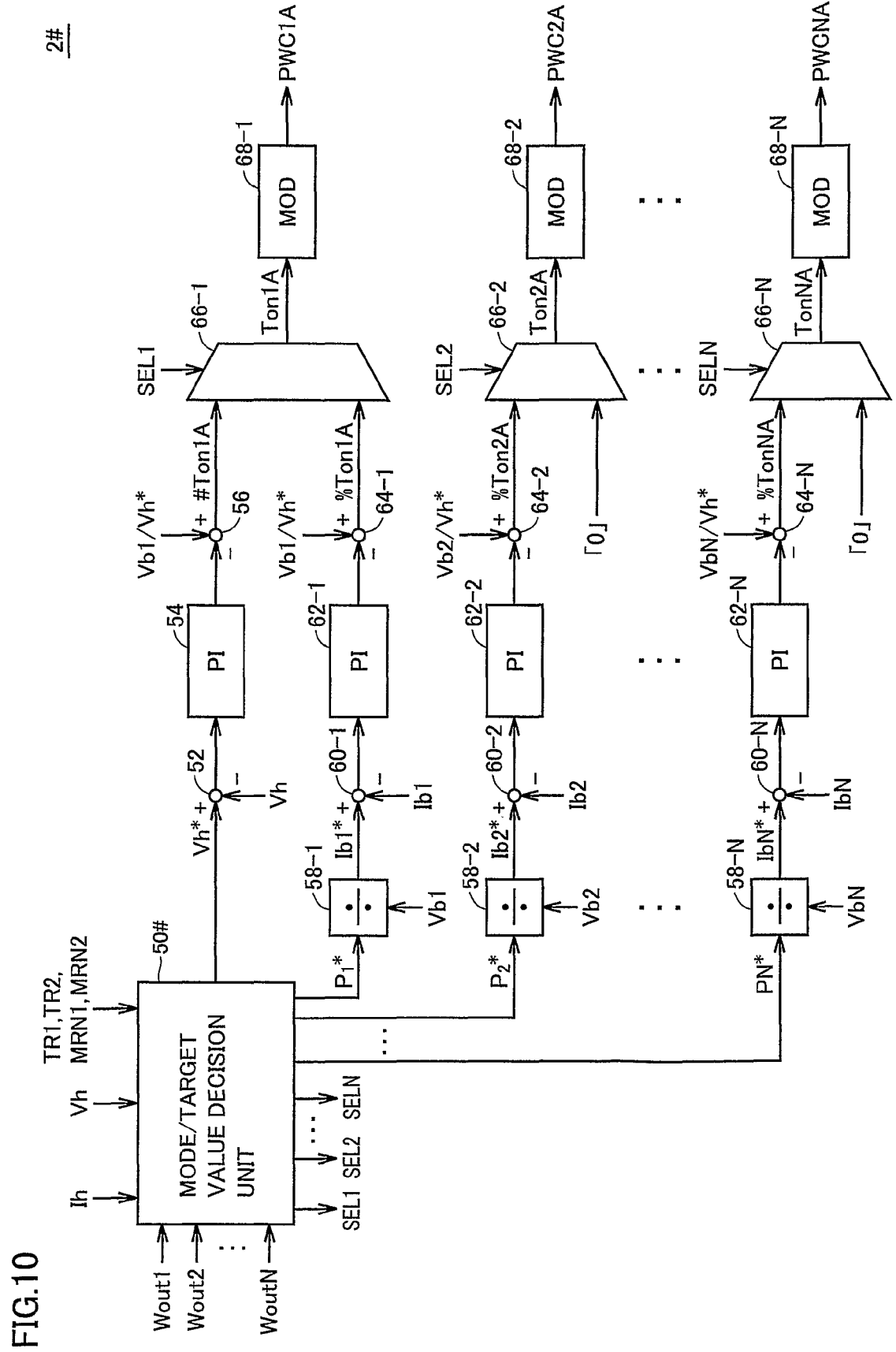
FIG. 10 is a block diagram for realizing generation of a switching instruction (boost operation) in the converter ECU according to the variation of the first embodiment of the present invention.

Referring to FIG. 10, in the block diagram of converter ECU 2#, division units 58-2 to 58-N, subtraction units 60-2 to 60-N, proportional control units 62-2 to 62-N, subtraction units 64-2 to 64-N, selection units 66-2 to 66-N, and modulation units 68-2 to 68-N are arranged instead of division unit 58-2, subtraction unit 60-2, proportional control unit 62-2, subtraction unit 64-2, selection unit 66-2, and modulation unit 68-2, and a mode/target value decision unit 50# is further arranged instead of mode/target value decision unit 50 in the block diagram shown in FIG. 4.

Mode/target value decision unit 50# decides the control mode in converter 8-1 (the voltage control mode or the current control mode) and the control mode in converters 8-2 to 8-N (the current control mode or the control stop mode), based on discharge allowable power Wout1 to WoutN, torque target values TR1, TR2 and rotation speed target values MRN1, MRN2. Then, mode/target value decision unit 50# outputs mode selection instructions SEL1 to SELN to selection units 66-1 to 66-N, in accordance with each decided mode.

In addition, mode/target value decision unit 50# decides the voltage target value and/or the current target value, in accordance with each decided mode. Specifically, if the voltage control mode is decided for converter 8-1, mode/target value decision unit 50# calculates a required voltage of drive force generation unit 3 (FIG. 1) based on torque target values TR1, TR2 and rotation speed target values MRN1, MRN2, and decides voltage target value Vh*. If the current control mode is decided for converter 8-1, mode/target value decision unit 50# decides power target value P1* in a range not exceeding discharge allowable power Wout1, to be allocated to converter 8-1 out of the actual power value. In addition, mode/target value decision unit 50# decides power target values P2* to PN* in a range not exceeding discharge allowable power Wout 2 to WoutN, to be allocated to converters 8-2 to 8-N, respectively.

Voltage target value Vh* and power target values P1* to PN* thus decided by mode/target value decision unit 50# are output to subtraction unit 52 and division units 58-1 to 58-N respectively.

As described above, as to converter 8-1, converter ECU 2# selects any one of a voltage control loop for input/output voltage value Vh and a current control loop for charging/discharging current value Ib1, and generates switching instruction PWC1A for controlling the boost operation.

Meanwhile, as to converters 8-2 to 8-N, converter ECU 2# selects any one of a current control loop for charging/discharging current values Ib2 to IbN and "0" (control stop), and generates switching instructions PWC2A to PWCNA for controlling the boost operation.

As the variation is otherwise the same as described in the first embodiment above in connection in FIG. 4, detailed description will not be repeated.

The control configuration and the block diagram for regenerative power are similar to the flowchart shown in FIG. 9 and the block diagram shown in FIG. 10 except that charge allowable power Win1 to WinN and charge allowable power total value ΣWin are used instead of discharge allowable power Wout1 to WoutN and discharge allowable power total value ΣWout.

According to the variation of the first embodiment of the present invention, even if three or more converters and power storage units are included, an effect similar to that in the first embodiment of the present invention described above can be achieved. Therefore, the number of converters and power storage units can relatively freely be designed, depending on the required electric power of the load device. Accordingly, the power supply system capable of supplying/receiving electric power to/from load devices of various sizes and types can be realized.

In addition, in the first embodiment of the present invention and the variation thereof, a configuration for supplying (discharging) electric power solely from the power storage unit to the load device has been illustrated, however, the present invention is applicable to any of a configuration for supplying (discharging) electric power from the power storage unit to the load device, a configuration for supplying (charging) electric power from the load device to the power storage unit, and a configuration adapted to both of the former.

Moreover, in the first embodiment of the present invention and the variation thereof, a configuration in which solely a specific converter (first converter 8-1) is controllable in the voltage control mode has been illustrated, however, it is not necessary to fix a converter configured to be controllable in such a voltage control mode. For example, a power storage unit having SOC closer to a control central value and a greatest margin for electric power fluctuation may successively be selected, and a converter connected to such a selected power storage unit may preferentially be chosen for the voltage control mode.

Second Embodiment

In the first embodiment described above, the power supply system capable of power management in each power storage unit with high accuracy while satisfying the power requirement of drive force generation unit 3 has been described. Meanwhile, in the second embodiment below, a power supply system capable of raising a temperature of the power storage unit while suppressing influence on the electric power supplied/received to/from the load device will be described.

Figure 11:
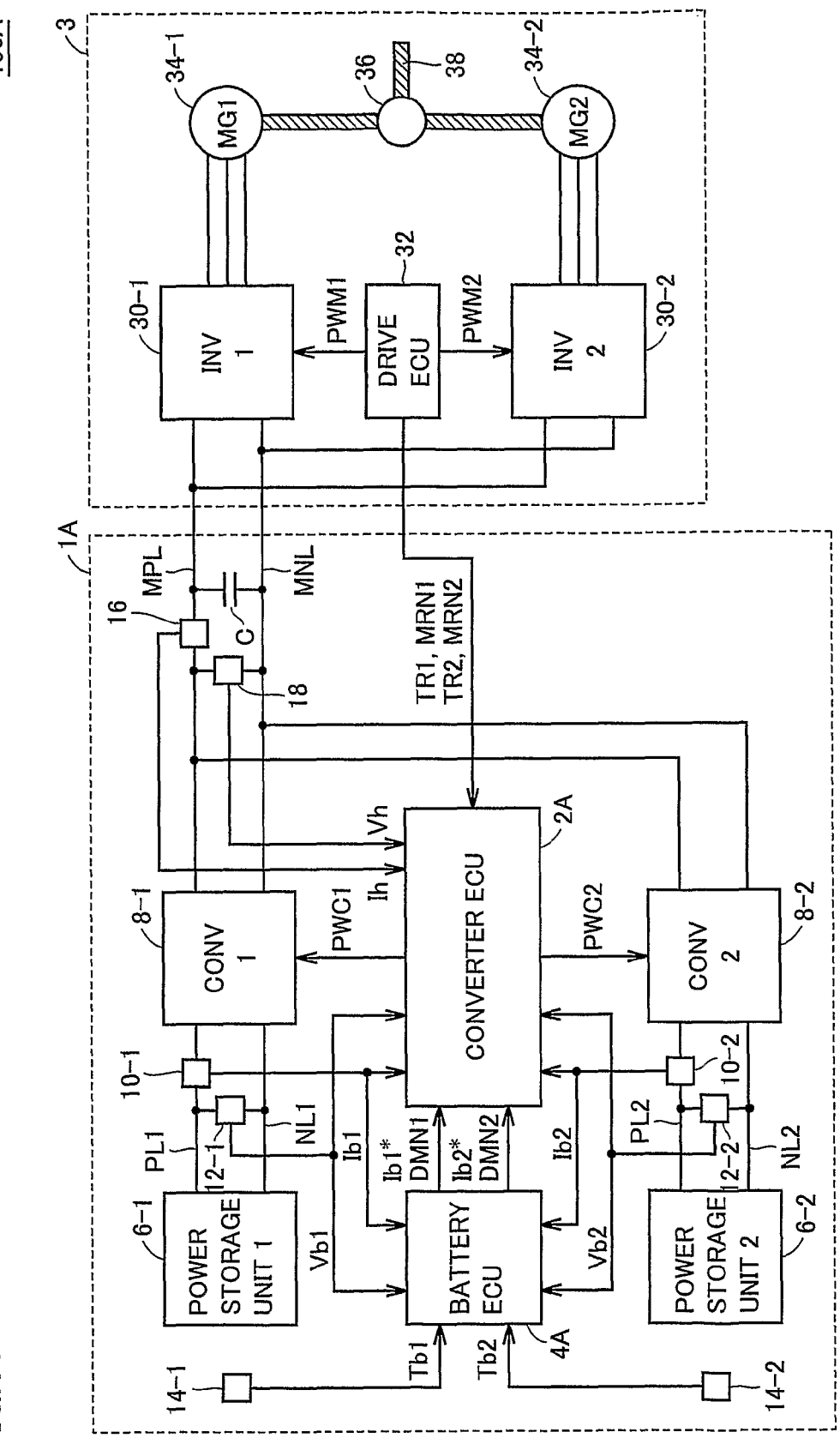
FIG. 11 is a schematic configuration diagram showing a substantial part of a vehicle including a power supply system according to the second embodiment of the present invention.

Referring to FIG. 11, a vehicle system 100A includes a power supply system 1A and drive force generation unit 3. Power supply system 1A is equivalent to a system where a converter ECU 2A and a battery ECU 4A are arranged instead of converter ECU 2 and battery ECU 4 in power supply system 1 according to the first embodiment shown in FIG. 1. As other parts of power supply system 1A and drive force generation unit 3 have been described above, detailed description will not be repeated.

Battery ECU 4A determines whether temperature increase control of power storage units 6-1, 6-2 is necessary or not, based on power storage unit temperatures Tb1, Tb2 received from temperature detection units 14-1, 14-2 respectively. Specifically, battery ECU 4A determines whether each of power storage unit temperatures Tb1, Tb2 is lower than a corresponding temperature lower limit value (for example, −10° C.), and outputs a temperature increase request for the power storage unit of which temperature is lower than the corresponding temperature lower limit value (temperature increase request DMN1 or temperature increase request DMN2) to converter ECU 2A.

At the same time, battery ECU 4A decides a current target value (current target value Ib1* or current target value Ib2*) in the current control mode based on the charge/discharge characteristic of the power storage unit in accordance with current power storage unit temperatures Tb1, Tb2, that is, based on relation between the charging/discharging current and the charge/discharge voltage (Ib-Vb characteristic), and outputs the current target value along with the temperature increase request to converter ECU 2A.

Meanwhile, if both of power storage unit temperatures Tb1, Tb2 are lower than the corresponding temperature lower limit value, battery ECU 4A outputs the temperature increase request for one power storage unit of higher priority, out of power storage units 6-1, 6-2. Here, priority is decided based on a full charge capacity of the power storage unit, SOC of the power storage unit, an amount of deviation of the power storage unit temperature from a prescribed operation temperature range, and the like.

In power supply system 1A according to the second embodiment, in addition to the configuration in which two power storage units having an identical characteristic value (for example, the full charge capacity, the voltage value, and the like) are arranged, a configuration in which two power storage units having characteristic values different from each other are arranged is possible. In addition, even if two power storage units are identical in the characteristic value, an embodiment where usage is different (for example, one steadily carries out charging/discharging, while the other carries out charging/discharging only during acceleration and deceleration) is also possible. Moreover, a configuration in which two power storage units are arranged in a vehicle in physical positions different from each other (for example, inside and outside the vehicle) is also possible.

As described above, a factor determining the power storage unit temperature is not the same, and it is not always the case that a period during which the power storage unit temperature is lower than the corresponding temperature lower limit coincides among the power storage units. Therefore, practical problem is less likely even in the configuration for raising a temperature of any one of power storage units 6-1, 6-2 as in power supply system 1A according to the second embodiment.

Meanwhile, converter ECU 2A generates switching instructions PWC1, PWC2 and controls converters 8-1, 8-2, in accordance with a control configuration which will be described later, based on input/output voltage value Vh received from input/output voltage detection unit 18, charging/discharging current values Ib1, Ib2 received from charging/discharging current detection units 10-1, 10-2, charge/discharge voltage values Vb1, Vb2 received from charge/discharge voltage detection units 12-1, 12-2, and temperature increase requests DMN1, DMN2 and current target values Ib1*, Ib2* received from battery ECU 4A, respectively. Specifically, receiving temperature increase request DMN1 or DMN2 from battery ECU 4A, converter ECU 2A sets the corresponding converter to the current control mode, while converter ECU 2A sets the remaining converter to the voltage control mode. In addition, converter ECU 2A executes the current control such that the charging/discharging current value of the converter set to the current control mode matches the current target value received from battery ECU 4A.

Converter ECU 2A provides a switching instruction to the converter set to the voltage control mode such that input/output voltage value Vh attains the prescribed voltage target value. Accordingly, the voltage of the electric power supplied/received between power supply system 1A and drive force generation unit 3 can be stabilized, without being affected by a state of the voltage conversion operation in the converter set to the current control mode, that is, the converter corresponding to the power storage unit of which temperature should be raised.

Here, input/output voltage value Vh experiences disturbance in accordance with balance in supply/reception of electric power between power supply system 1A and drive force generation unit 3. Namely, if an amount of power supply in entire vehicle 100A is small relative to the total amount of power consumption, input/output voltage value Vh becomes lower. Meanwhile, if an amount of power supply in entire vehicle 100A is great relative to the total amount of power consumption, input/output voltage value Vh becomes higher. In other words, control such that input/output voltage value Vh attains the prescribed voltage target value means indirect control of electric power supplied from the converter set to the voltage control mode in accordance with fluctuation in power consumption (or regenerative power) in drive force generation unit 3. Therefore, power supply system 1A can raise the temperature of the power storage unit for which temperature increase has been requested, while influence on the electric power supplied/received to/from drive force generation unit 3 is suppressed.

As power supply system 1A is otherwise the same as power supply system 1 according to the first embodiment described above, detailed description will not be repeated.

In the second embodiment, drive force generation unit 3 corresponds to the "load device", main positive bus MPL and main negative bus MNL correspond to the "power line", and converters 8-1, 8-2 correspond to the "plurality of voltage conversion units." In addition, battery ECU 4A implements the "power storage unit temperature obtaining means" and the "temperature determination means", and converter ECU 2A implements the "temperature determination means" and the "mode setting means". Moreover, converter ECU 2A corresponds to the "control device".

It is noted that, in the description below, converters 8-1, 8-2, power storage units 6-1, 6-2, charging/discharging currents Ib1, Ib2, charge/discharge voltages Vb1, Vb2, and power storage unit temperatures Tb1, Tb2 are also collectively denoted simply as converter 8, power storage unit 6, charging/discharging current Ib, charge/discharge voltage Vb, and power storage unit temperature Tb, respectively.

Figure 12:
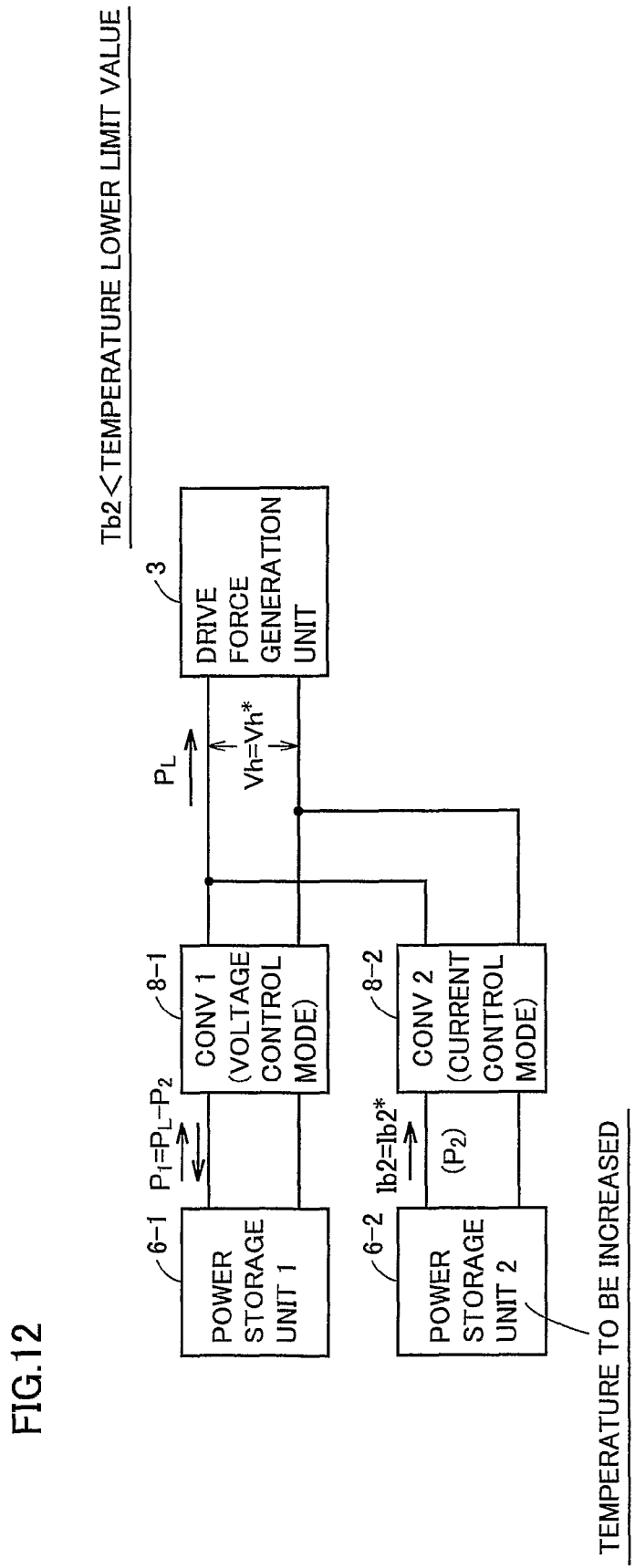
FIG. 12 illustrates power allocation between converters when a temperature of one power storage unit is raised.

Referring to FIG. 12, an example in which power storage unit temperature Tb2 of power storage unit 6-2 is lower than the temperature lower limit value will be described. When battery ECU 4A outputs temperature increase request DMN2 for power storage unit 6-2 to converter ECU 2A, converter ECU 2A sets converter 8-2 connected to power storage unit 6-2 to the current control mode, and sets remaining converter 8-1 to the voltage control mode. Then, converter ECU 2A generates switching instruction PWC2 and controls converter 8-2 such that charging/discharging current ib2 of power storage unit 6-2 matches with current target value Ib2* received from battery ECU 4A. In addition, converter ECU 2A generates switching instruction PWC1 and controls converter 8-1 such that input/output voltage value Vh matches with voltage target value Vh*.

Therefore, charging/discharging current Ib2 of power storage unit 6-2 is maintained at current target value Ib2* suitable for temperature increase in power storage unit 6-2. Here, if the electric power required in drive force generation unit 3 is assumed as drive power PL, converter 8-2 (that is, power storage unit 6-2) is responsible for drive power P2 corresponding to charging/discharging current Ib2. Meanwhile, as described above, converter 8-1 carries out control for indirectly maintaining balance of the electric power. Therefore, drive power P1 allocated to converter 8-1 (that is, power storage unit 6-1) satisfies relation of drive power P1=drive power PL−drive power P2.

Naturally, if drive power PL of drive force generation unit 3 fluctuates due to some factor, drive power P1 of converter 8-1 varies toward any of the discharge side and the charge side. Meanwhile, as charging/discharging current Ib2 of drive power P2 of converter 8-2 is controlled such that it matches with current target value Ib2*, drive power P2 of converter 8-2 is substantially constant over time. Therefore, converter 8-1 compensates for the fluctuation component of drive power PL of drive force generation unit 3.

Though FIG. 12 above illustrates an example in which temperature of power storage unit 6-2 is to be raised, power allocation is performed similarly also in an example in which temperature of power storage unit 6-1 is to be raised.

Figure 13:
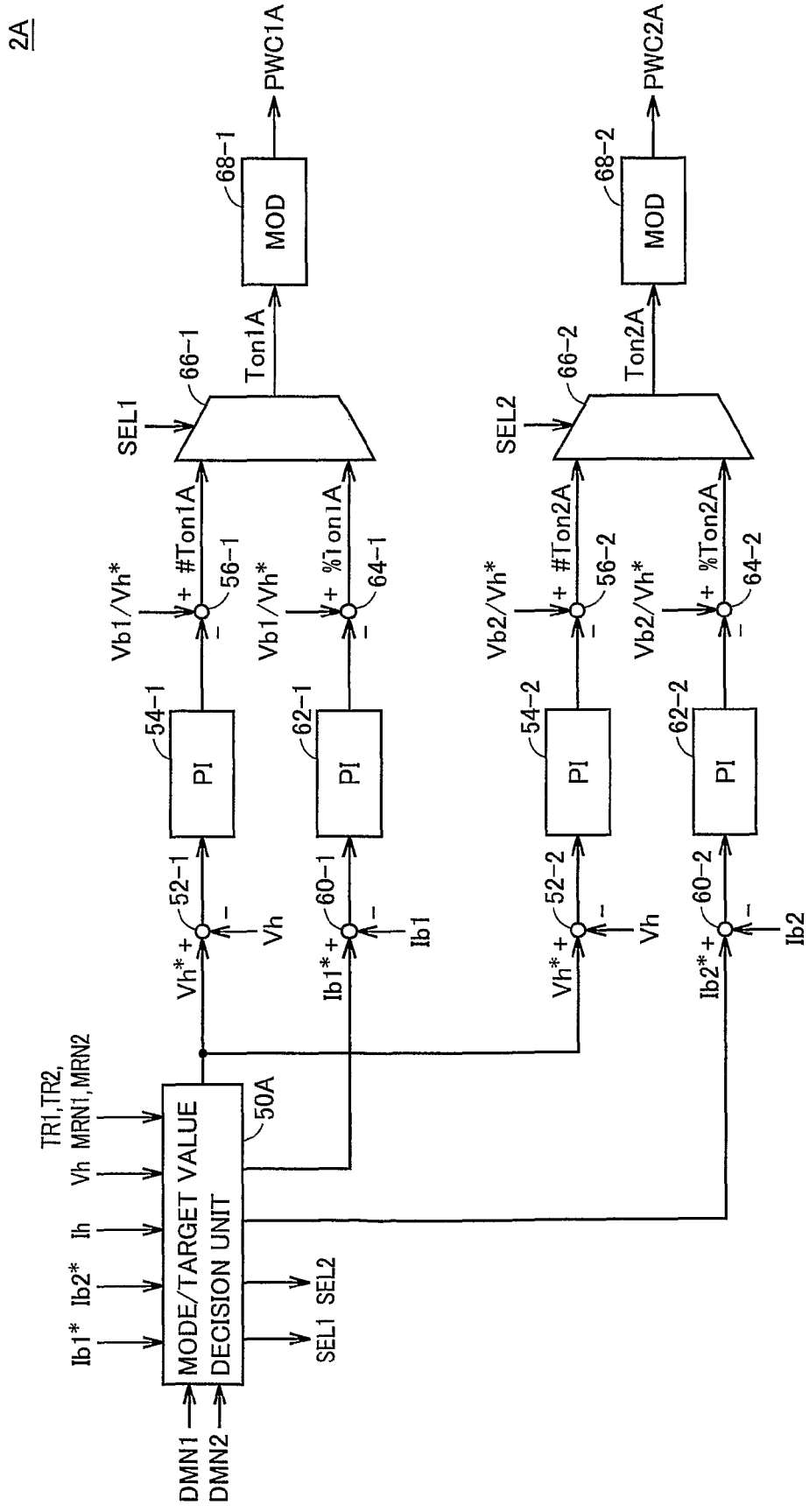
FIG. 13 is a block diagram for realizing generation of a switching instruction in a converter according to the second embodiment of the present invention.

Referring to FIG. 13, converter ECU 2A includes a mode/target value decision unit 50A, subtraction units 52-1, 52-2, 56-1, 56-2, 60-1, 60-2, 64-1, 64-2, proportional control units (PI) 54-1, 54-2, 62-1, 62-2, selection units 66-1, 66-2, and modulation units (MOD) 68-1, 68-2.

Subtraction units 52-1, 56-1 and proportional control unit 54-1 constitute the control block for realizing the voltage control mode in converter 8-1, and outputs duty instruction (voltage control mode) #Ton1A for converter 8-1 to selection unit 66-1. Subtraction units 60-1, 64-1 and proportional control unit 62-1 constitute the control block for realizing the current control mode in converter 8-1, and outputs duty instruction (current control mode) % Ton1A for converter 8-1 to selection unit 66-1.

Similarly, subtraction units 52-2, 56-2 and proportional control unit 54-2 constitute the control block for realizing the voltage control mode in converter 8-2, and outputs duty instruction (voltage control mode) #Ton2A for converter 8-2 to selection unit 66-2. Subtraction units 60-2, 64-2 and proportional control unit 62-2 constitute the control block for realizing the current control mode in converter 8-2, and outputs duty instruction (current control mode) % Ton2A for converter 8-2 to selection unit 66-2.

Mode/target value decision unit 50A decides the control mode in converter 8-1 (the voltage control mode or the current control mode) and the control mode in converter 8-2 (the voltage control mode or the current control mode), based on temperature increase requests DMN1, DMN2. Then, mode/target value decision unit 50A outputs mode selection instructions SEL1, SEL2 to selection units 66-1, 66-2 respectively, in accordance with each decided mode.

Selection unit 66-1 selects any one of duty instruction (voltage control mode) #Ton1A and duty instruction (current control mode) % Ton1A based on mode selection instruction SEL1, and outputs the selected one as duty instruction Ton1A to modulation unit 68-1. In addition, selection unit 66-2 selects any one of duty instruction (voltage control mode) #Ton2A and duty instruction (current control mode) %

Ton2A based on mode selection instruction SEL2, and outputs the selected one as duty instruction Ton2A to modulation unit 68-2.

In addition, in order to set the current target value in the current control mode, mode/target value decision unit 50A outputs current target values Ib1*, Ib2* provided along with temperature increase requests DMN1, DMN2 to subtraction units 60-1, 60-2 respectively. Meanwhile, in order to set the voltage target value in the voltage control mode, mode/target value decision unit 50A outputs prescribed voltage target value Vh* to subtraction units 52-1, 52-2. It is noted that voltage target value Vh* may be a fixed value that has been set in advance, or a variable value that is varied in correspondence with the charge/discharge voltage of the power storage unit of which temperature should be raised.

The control modes in converters 8-1, 8-2 are thus set in accordance with temperature increase requests DMN1, DMN2 from battery ECU 4A respectively, and control is carried out.

As details in each block have been described in connection with FIG. 4 above, description will not be repeated.

Meanwhile, in order to increase a rate in raising the temperature of power storage unit 6, charging/discharging current Ib as large as possible is desirably fed. On the other hand, with the increase in charging/discharging current Ib, charge/discharge voltage Vb of power storage unit 6 considerably lowers. Such considerable lowering in charge/discharge voltage Vb may become a factor to deteriorate power storage unit 6.

Figure 14:
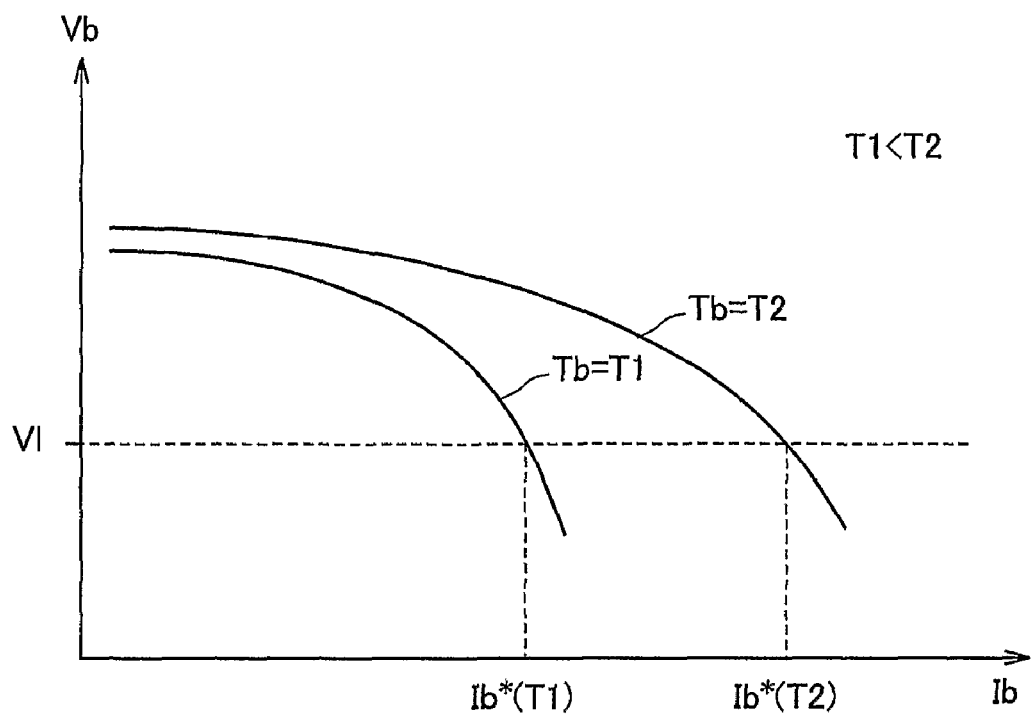
FIG. 14 is a schematic diagram showing one example of charge/discharge characteristic of a power storage unit.

Referring to FIG. 14, it can be seen that charge/discharge voltage Vb lowers with the increase in charging/discharging current Ib of power storage unit 6. This is because voltage lowering occurs in power storage unit 6 due to internal resistance caused by polarization reaction in power storage unit 6. In addition, such polarization reaction has great dependency on the temperature, and the internal resistance increases as the temperature of power storage unit 6 is lower. Therefore, as shown in FIG. 14, as the temperature of power storage unit 6 is lower, charge/discharge voltage Vb considerably lowers, even if charging/discharging current Ib is less.

Accordingly, battery ECU 4A stores the charge/discharge characteristic as shown in FIG. 14 in advance for example as a map, and decides the charging/discharging current based on the charge/discharge characteristic of power storage unit 6 in accordance with current power storage unit temperature Tb such that charge/discharge voltage Vb of power storage unit 6 is not lower than a prescribed voltage lower limit value V1. For example, as shown in FIG. 14, when power storage unit temperature Tb of power storage unit 6 is set to T1, current target value Ib (T1) is decided based on the point of intersection of voltage lower limit value V1 and the charge/discharge characteristic in accordance with power storage unit temperature T1. Meanwhile, if the power storage unit temperature of power storage unit 6 is set to T2 (T1<T2), current target value Ib (T2) is decided based on the point of intersection of voltage lower limit value V1 and the charge/discharge characteristic in accordance with power storage unit temperature T2.

Figure 15:
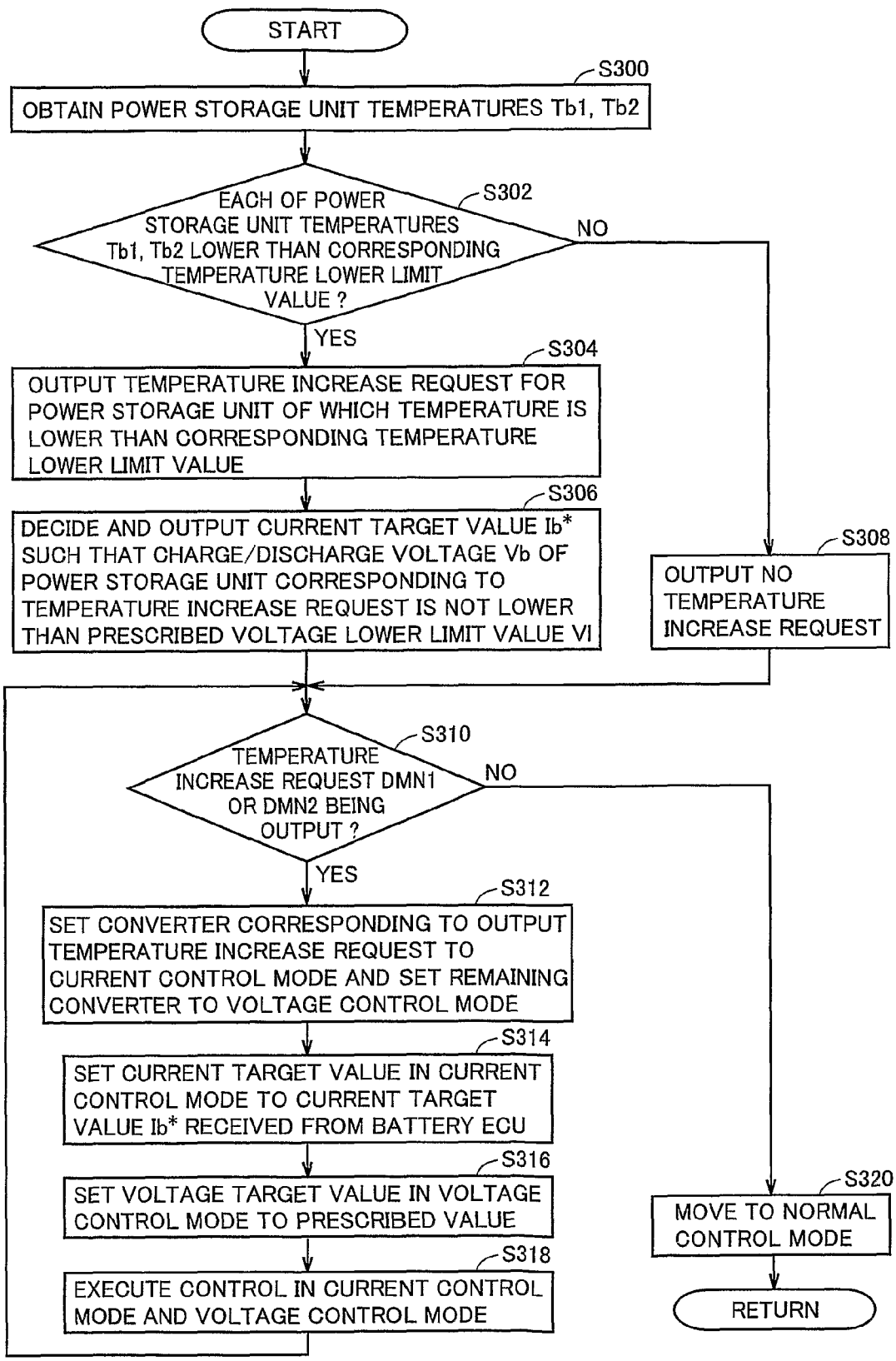
FIG. 15 is a flowchart showing a control configuration for realizing control of temperature increase in the power storage unit according to the second embodiment of the present invention.

It is noted that such charge/discharge characteristics associated with power storage unit temperature Tb of power storage unit 6 have been experimentally obtained in advance, Referring to FIG. 15, battery ECU 4A obtains power storage unit temperatures Tb1, Tb2 of power storage units 6-1, 6-2 from temperature detection units 14-1, 14-2 (step S300). Then, battery ECU 4A determines whether each of obtained power storage unit temperatures Tb1, Tb2 is lower than the corresponding temperature lower limit value (step S302).

If any one of power storage unit temperatures Tb1, Tb2 is lower than the corresponding temperature lower limit value (YES in step S302), battery ECU 4A outputs temperature increase request DMN1 or DMN2 for the power storage unit of which temperature is lower than the corresponding temperature lower limit value, to converter ECU 2A (step S304). If both of power storage unit temperatures Tb1, Tb2 are lower than the corresponding temperature lower limit value, battery ECU 4A outputs solely the temperature increase request for one power storage unit of higher priority. In addition, battery ECU 4A decides current target value Ib* based on the charge/discharge characteristic in accordance with the power storage unit temperature such that charge/discharge voltage Vb of the power storage unit corresponding to the temperature increase request, is not lower than prescribed voltage lower limit value V1, and outputs the current target value to converter ECU 2A (step S306).

If none of power storage unit temperatures Tb1, Tb2 is lower than the corresponding temperature lower limit value (NO in step S302), battery ECU 4A outputs no temperature increase request to converter ECU 2A (step S308).

Meanwhile, converter ECU 2A determines whether temperature increase request DMN1 or DMN2 is output from battery ECU 4A or not (step S310).

If temperature increase request DMN1 or DMN2 is output from battery ECU 4A (YES in step S310), converter ECU 2A sets the converter corresponding to the output temperature increase request to the current control mode, and sets the remaining converter to the voltage control mode (step S312). In addition, converter ECU 2A sets the current target value in the current control mode to current target value Ib* received from battery ECU 4A (step S314), and sets the voltage target value in the voltage control mode to a prescribed value (step S316). Then, converter ECU 2A carries out control in the current control mode and the voltage control mode (step S318).

Thereafter, converter ECU 2A determines again whether temperature increase request DMN1 or DMN2 is output from battery ECU 4A or not (step S310).

If none of temperature increase requests DMN1 and DMN2 is output from battery ECU 4A (NO in step S310), converter ECU 2A moves to the normal control mode (step S320). Then, converter ECU 2A returns to the initial processing.

It is noted that the "normal control mode" herein is not limited to a specific control mode, however, for example, a configuration where any converter is controlled in the voltage control mode, a configuration where any converter is controlled in the current control mode, or the like is preferable. In addition, as shown in FIG. 3 above, a configuration may be such that the control configuration according to the first embodiment of the present invention is further executed.

According to the second embodiment of the present invention, the converter corresponding to the power storage unit out of the two power storage units, of which temperature has been determined as lower than the temperature lower limit value, performs the voltage conversion operation in the current control mode, and the remaining converter performs the voltage conversion operation in the voltage control mode. Therefore, the charging/discharging current for raising the temperature of the power storage unit can be ensured, and the voltage of the electric power supplied/received to/from the drive force generation unit can be stabilized. In addition, the converter performing the voltage conversion operation in the voltage control mode compensates for fluctuation generated in the electric power supplied/received to/from the drive force generation unit. Thus, the temperature of the power storage unit lower than the temperature lower limit value can be raised, while influence on the electric power supplied/received to/from the drive force generation unit is suppressed.

In addition, according to the second embodiment of the present invention, the charging/discharging current for raising the temperature of the power storage unit lower than the temperature lower limit value is decided based on the charge/discharge characteristic in accordance with the present power storage unit temperature of that power storage unit, such that the charge/discharge voltage of the power storage unit is not lower than the prescribed voltage lower limit value. Therefore, deterioration of the power storage unit attributed to the charging/discharging current involved with the temperature increase can be avoided, and the rate in raising the temperature of the power storage unit can be optimized.

(First Variation)

In the present invention, the converter corresponding to the power storage unit, of which temperature has been determined as lower than the temperature lower limit value, is caused to perform the voltage conversion operation in the voltage control mode, and the remaining converter may perform the voltage conversion operation in the current control mode.

Figure 16:
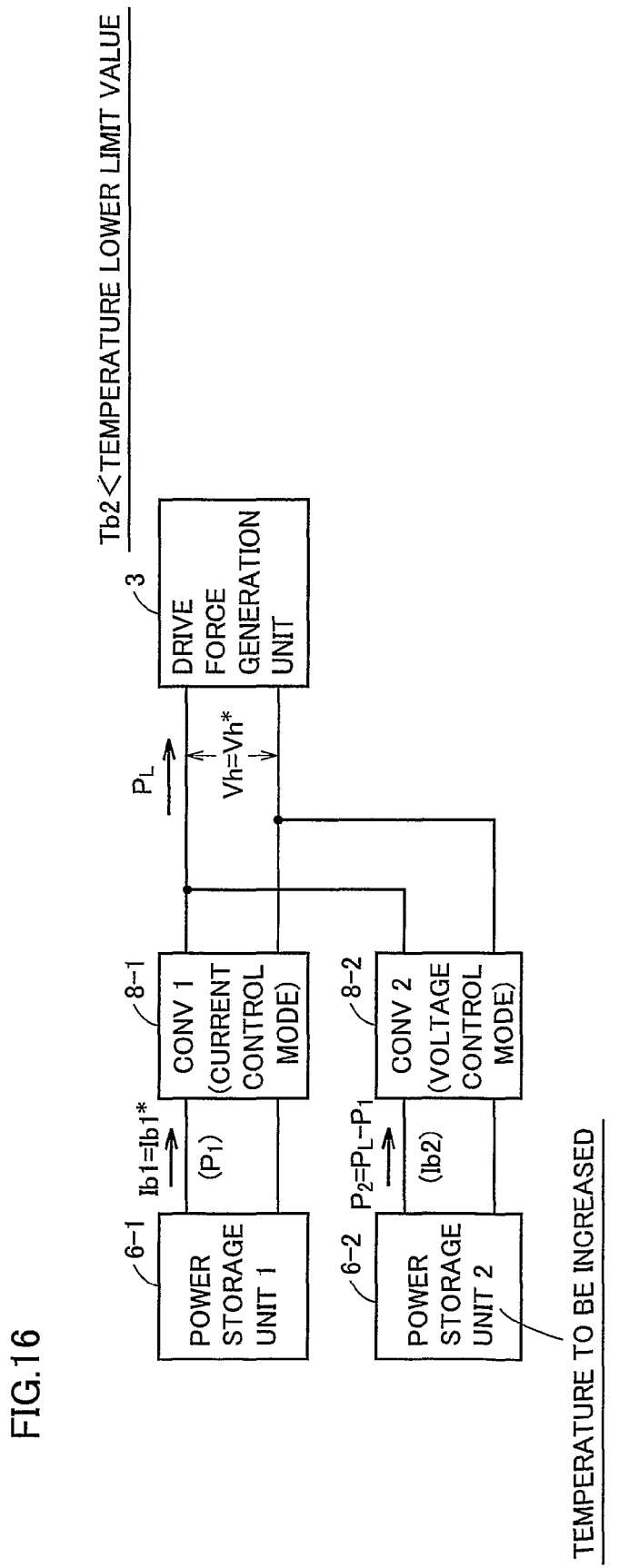
FIG. 16 illustrates power allocation between converters when a temperature of one power storage unit is raised in a first variation of the second embodiment of the present invention.

Referring to FIG. 16, for example, an example in which power storage unit temperature Tb2 of power storage unit 6-2 is lower than the temperature lower limit value will be described. Drive power PL required in drive force generation unit 3 is allocated to converters 8-1 and 8-2. Accordingly, if the drive power of converter 8-1 is assumed as P1 (the discharge side is assumed as +), drive power P2 of converter 8-2 satisfies relation of drive power P2=drive power PL−drive power P1. Meanwhile, drive power P2 allocated to converter 8-2 is comparable to a product of charging/discharging current value Ib2 of power storage unit 6-2 and charge/discharge voltage value Vb2 of power storage unit 6-2.

Therefore, by appropriately setting drive power P1 of converter 8-1 based on drive power PL and charge/discharge voltage value Vb2 of power storage unit 6-2, charging/discharging current value Ib2 discharged from power storage unit 6-2 through converter 8-2 can indirectly be controlled.

More specifically, as converter CONV 8-1 performs the voltage conversion operation in the current control mode, current target value Ib1* is calculated from drive power P1 decided based on drive power PL and charge/discharge voltage value Vb2 of power storage unit 6-2. Then, converter 8-2 is controlled such that charging/discharging current Ib1 thereof matches with current target value Ib1*.

As the control configuration in the current control mode and the voltage control mode is the same as that in the second embodiment of the present invention shown in FIG. 13, detailed description will not be repeated.

According to the first variation of the second embodiment of the present invention, an effect the same as in the second embodiment of the present invention above can be achieved, even if the converter corresponding to the power storage unit, of which temperature has been determined as lower than the temperature lower limit value, is set to the voltage control mode and the remaining converter is set to the current control mode.

(Second Variation)

The present invention is also applicable to a power supply system having three or more power storage units in addition to the power supply system having two power storage units described above.

Figure 17:
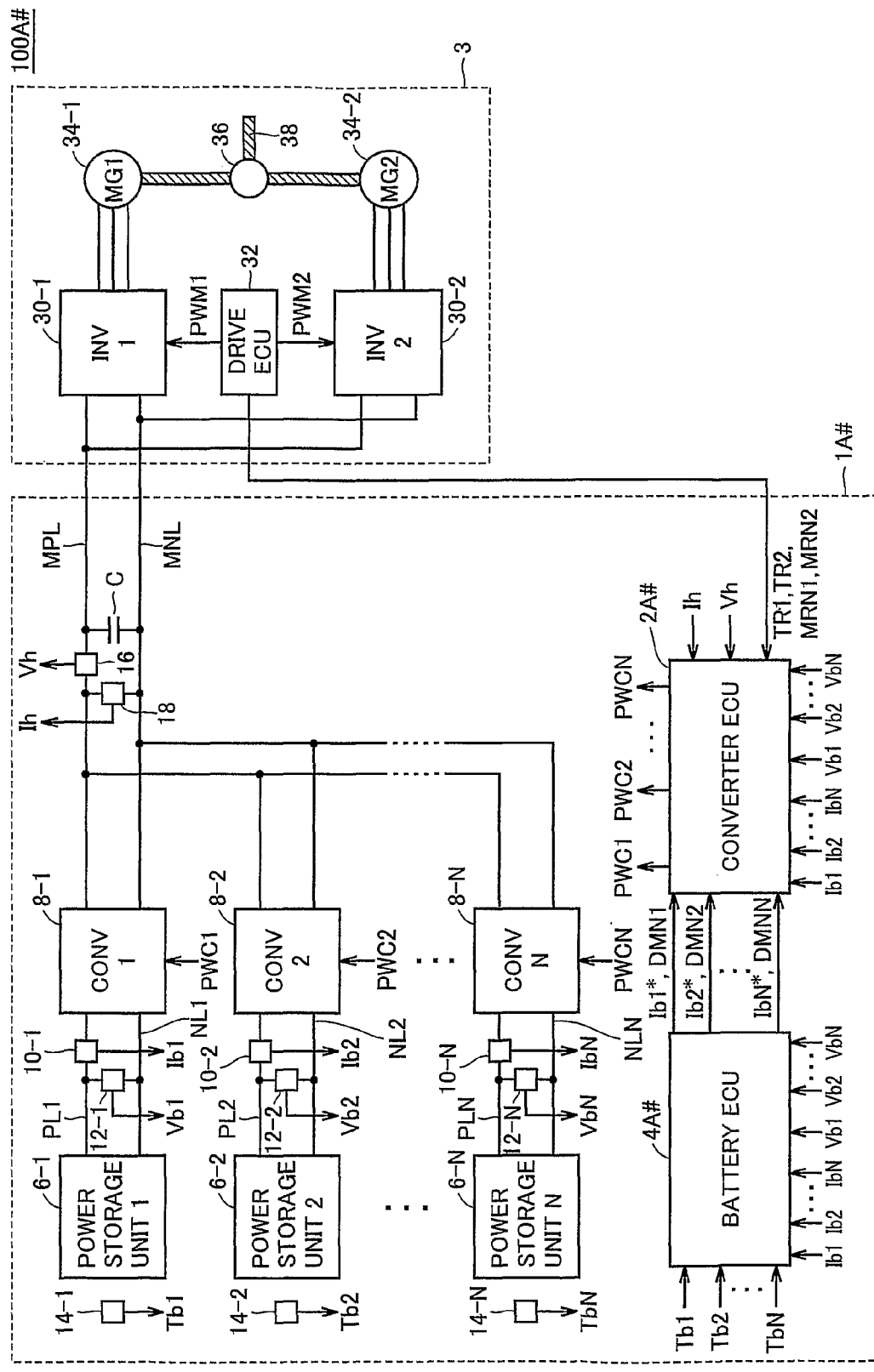
FIG. 17 is a schematic configuration diagram showing a substantial part of a vehicle including a power supply system according to a second variation of the second embodiment of the present invention.

Referring to FIG. 17, a vehicle system 100A# includes a power supply system 1A# and drive force generation unit 3. Power supply system 1A# is equivalent to a system where a converter ECU 2A# and a battery ECU 4A# are arranged instead of converter ECU 2# and battery ECU 4# in power supply system 1# according to the variation of the first embodiment shown in FIG. 8. As other parts of power supply system 1A# and drive force generation unit 3 have been described above, detailed description will not be repeated.

Battery ECU 4A# determines whether temperature increase control of power storage units 6-1 to 6-N is necessary or not, based on power storage unit temperatures Tb1 to TbN received from temperature detection units 14-1 to 14-N respectively, Specifically, battery ECU 4A# determines whether each of power storage unit temperatures Tb1 to TbN is lower than the corresponding temperature lower limit value, and outputs the temperature increase requests DMN1 to DMNN for power storage units 6-1 to 6-N of which temperatures are lower than the corresponding temperature lower limit value to converter ECU 2A#.

At the same time, battery ECU 4A# decides current target values Ib1* to IbN* for power storage units 6-1 to 6-N respectively, based on the charge/discharge characteristic of the power storage unit in accordance with current power storage unit temperatures Tb1 to TbN, that is, based on relation between the charging/discharging current and the charge/discharge voltage (Ib-Vb characteristic), and outputs the current target values along with the temperature increase requests DMN1 to DMNN to converter ECU 2A#.

Here, in power supply system 1A# according to the second variation of the second embodiment, at least one converter out of converters 8-1 to 8-N should be set to the voltage control mode. Accordingly, if all power storage unit temperatures Tb1 to TbN are lower than the corresponding temperature lower limit value, battery ECU 4A# does not output the temperature increase request for at least one power storage unit of low priority. Here, priority is decided based on an amount of deviation of the power storage unit temperature from a prescribed operation temperature range, SOC of the power storage unit, and the like.

Meanwhile, converter ECU 2A# generates switching instructions PWC1 to PWCN and controls converters 8-1 to 8-N in accordance with a control configuration which will be described later, based on input/output voltage value Vh received from input/output voltage detection unit 18, charging/discharging current values Ib1 to IbN received from charging/discharging current detection units 10-1 to 10-N, charge/discharge voltage values Vb1 to VbN received from charge/discharge voltage detection units 12-1 to 12-N, and temperature increase requests DMN1 to DMNN and current target values Ib1* to IbN* received from battery ECU 4A#, respectively. Specifically, upon receiving any one of temperature increase requests DMN1 to DMNN from battery ECU 4A#, converter ECU 2A# sets the corresponding converters to the current control mode, while converter ECU 2A# sets the remaining converters to the voltage control mode. In addition, converter ECU 2A# executes the current control mode such that the charging/discharging current value of the converter set to the current control mode matches the current target value received from battery ECU 4A#.

In addition, converter ECU 2A# provides a switching instruction to the converter set to the voltage control mode such that input/output voltage value Vh attains the prescribed voltage target value. Accordingly, the voltage of the electric power supplied/received between power supply system 1A# and drive force generation unit 3 can be stabilized, without being affected by the charging/discharging current of the converter set to the current control mode, that is, the converter connected to the power storage unit of which temperature should be raised.

As power supply system 1A# is otherwise the same as power supply system 1# according to the variation of the first embodiment described above or power supply system 1A according to the second embodiment, detailed description will not be repeated.

In the second variation of the second embodiment, drive force generation unit 3 corresponds to the "load device", main positive bus MPL and main negative bus MNL correspond to the "power line", and converters 8-1 to 8-N correspond to the "plurality of voltage conversion units." In addition, battery ECU 4A# implements the "power storage unit temperature obtaining means" and the "temperature determination means", and converter ECU 2A# implements the "temperature determination means" and the "mode setting means". Moreover, converter ECU 2A# corresponds to the "control device".

Figure 18:
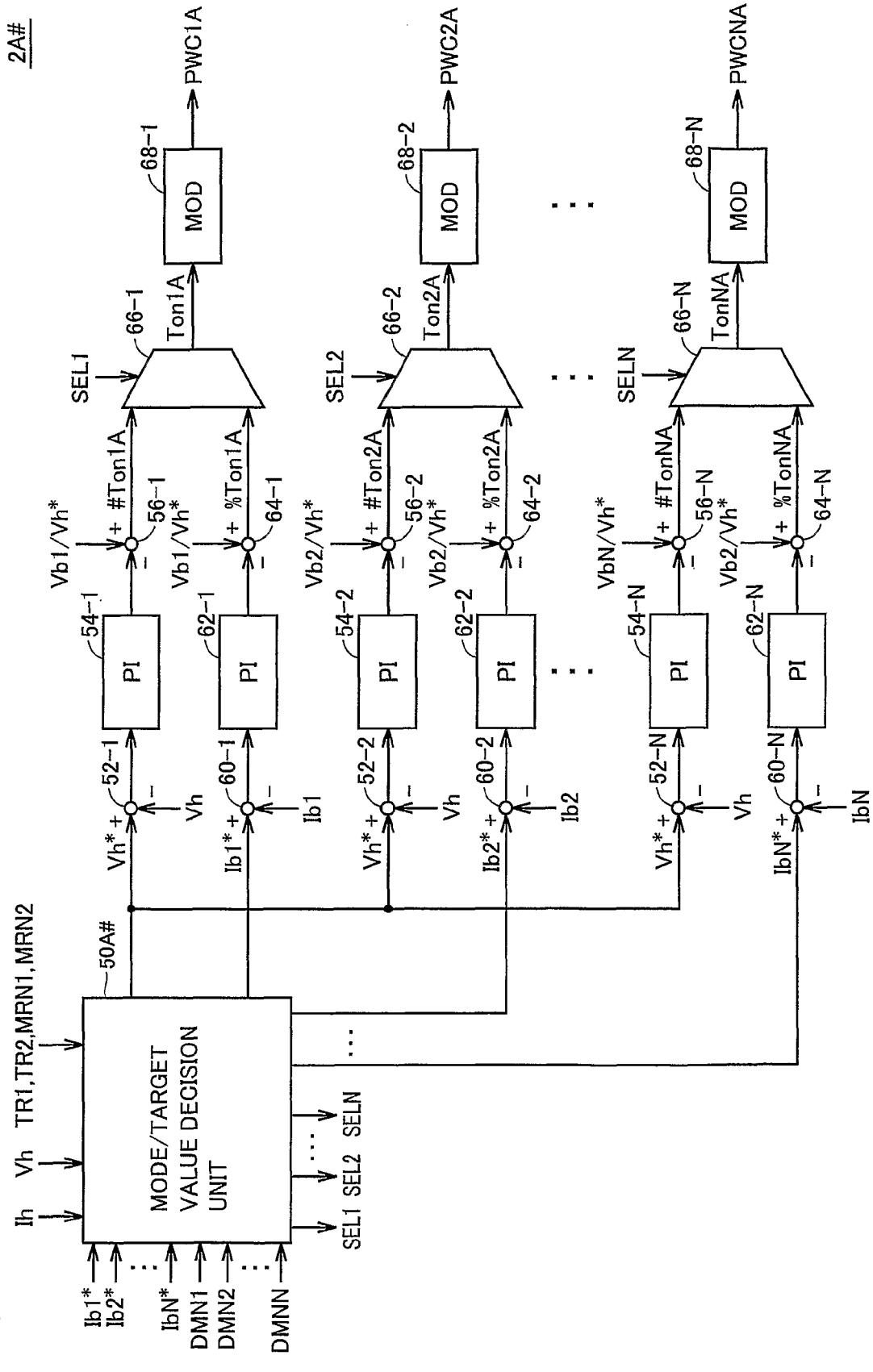
FIG. 18 is a block diagram for realizing generation of a switching instruction in a converter ECU according to the second variation of the second embodiment of the present invention.

Referring to FIG. 18, the control block of converter ECU 2A# is implemented by expanding the control block shown in FIG. 13, and includes a mode/target value decision unit 50A#, subtraction units 52-1 to 52-N, 56-1 to 56-N, 60-1 to 60-N, 64-1 to 64-N, proportional control units (PI) 54-1 to 54-N, 62-1 to 62-N, selection units 66-1 to 66-N, and modulation units (MOD) 68-1 to 68-N.

As described above, subtraction units 52-1, 56-1 and proportional control unit 54-1 constitute the control block for realizing the voltage control mode in converter 8-1, and outputs duty instruction (voltage control mode) #Ton1A for converter 8-1 to selection unit 66-1. In addition, subtraction units 60-1, 64-1 and proportional control unit 62-1 constitute the control block for realizing the current control mode in converter 8-1, and outputs duty instruction (current control mode) % Ton1A for converter 8-1 to selection unit 66-1.

Similarly, the control block for realizing the voltage control mode and the control block for realizing the current control mode are arranged for each of converters 8-2 to 8-N.

Mode/target value decision unit 50A# decides the control mode in each of converters 8-1 to 8-N (the voltage control mode or the current control mode) based on temperature increase requests DMN1 to DMNN. Then, mode/target value decision unit 50A# outputs mode selection instructions SEL1 to SELN to selection units 66-1 to 66-N respectively, in accordance with each decided mode.

Selection unit 66-1 selects any one of duty instruction (voltage control mode) #Ton1A and duty instruction (current control mode) % Ton1A based on mode selection instruction SEL1, and outputs the selected one as duty instruction Ton1A to modulation unit 68-1.

Similarly, selection units 66-2 to 66-N select the duty instruction in accordance with mode selection instructions SEL2 to SELN, and output the selected ones to modulation units 68-2 to 68-N, respectively.

In addition, mode/target value decision unit 50A# sets the current target value in the current control mode, by providing current target values Ib1* to IbN* output from battery ECU 4A# to subtraction units 60-1 to 60-N.

As the second variation is otherwise the same as the second embodiment above, detailed description will not be repeated.

Figure 19:
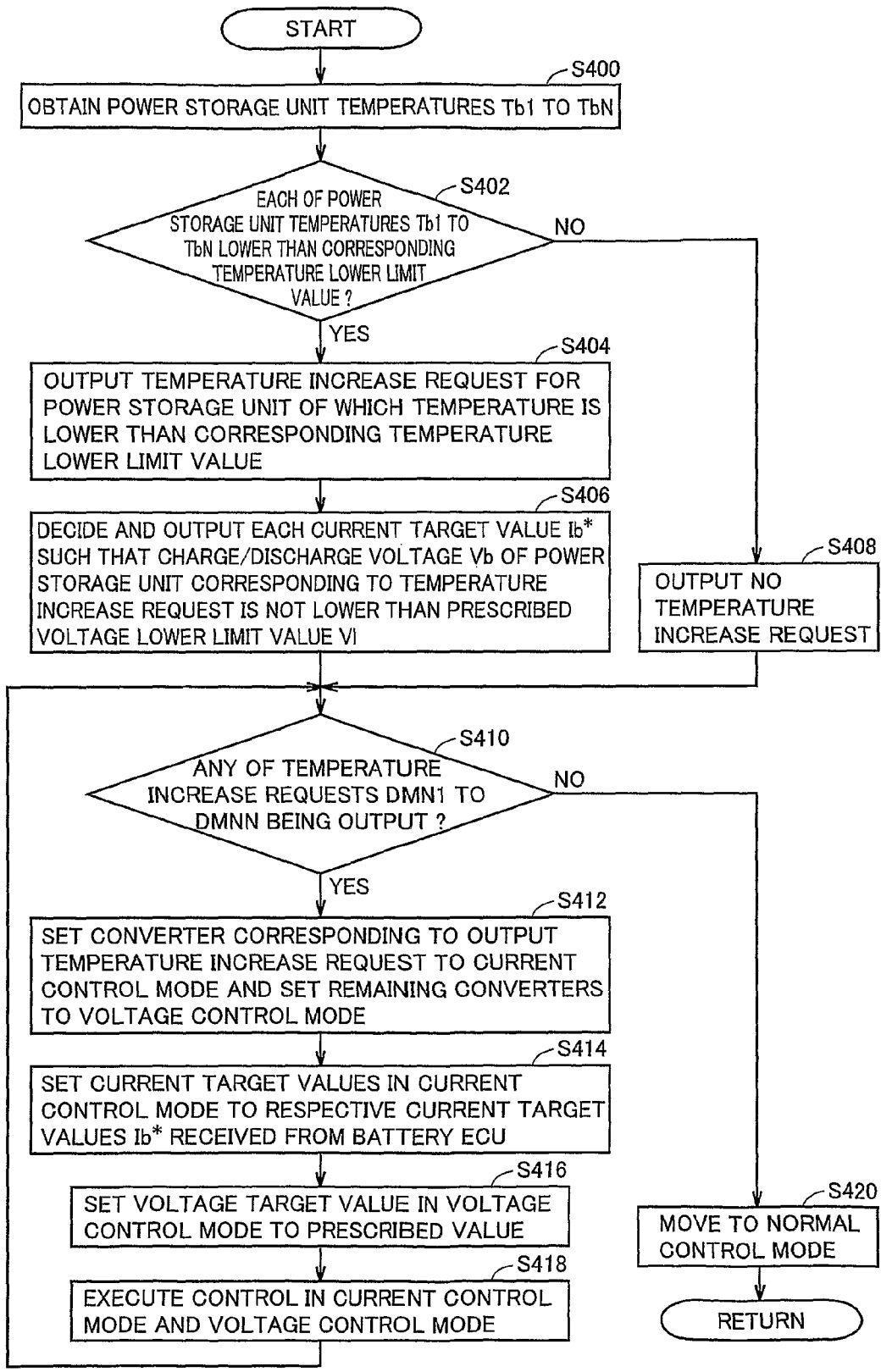
FIG. 19 is a flowchart showing a control configuration for realizing control of temperature increase in a power storage unit according to the second variation of the second embodiment of the present invention.

Referring to FIG. 19, battery ECU 4A# obtains power storage unit temperatures Tb1 to TbN of power storage units 6-1 to 6-N from temperature detection units 14-1 to 14-N (step S400). Then, battery ECU 4A# determines whether or not each of obtained power storage unit temperatures Tb1 to TbN is lower than the corresponding temperature lower limit value (step S402).

If any one of power storage unit temperatures Tb1 to TbN is lower than the corresponding temperature lower limit value (YES in step S402), battery ECU 4A# outputs the temperature increase request for the power storage unit, of which temperature is lower than the corresponding temperature lower limit value, to converter ECU 2A# (step S404). If all power storage unit temperatures Tb1 to TbN are lower than the corresponding temperature lower limit value, battery ECU 4A# does not output the temperature increase request for at least one power storage unit of lower priority. In addition, battery ECU 4A# decides current target value Ib* for each converter based on the charge/discharge characteristic in accordance with the power storage unit temperature, such that charge/discharge voltage Vb of the power storage unit corresponding to the temperature increase request, is not lower than prescribed voltage lower limit value V1, and outputs the current target value to converter ECU 2A# (step S406).

If none of power storage unit temperatures Tb1 to TbN is lower than the corresponding temperature lower limit value (NO in step S402), battery ECU 4A# outputs no temperature increase request to converter ECU 2A# (step S408).

Meanwhile, converter ECU 2A# determines whether any one of temperature increase requests DMN1 to DMNN is output from battery ECU 4A# (step S410).

If any one of temperature increase requests DMN1 to DMNN is output from battery ECU 4A# (YES in step S410), converter ECU 2A# sets the converter corresponding to the output temperature increase request to the current control mode, and sets the remaining converters to the voltage control mode (step S412). In addition, converter ECU 2A# sets the current target values in the current control mode to respective current target values Ib* received from battery ECU 4A# (step S414), and sets the voltage target value in the voltage control mode to a prescribed value (step S416). Then, converter ECU 2A# starts control in the current control mode and the voltage control mode (step S418).

Thereafter, converter ECU 2A# determines again whether any one of temperature increase requests DMN1 to DMNN is output from battery ECU 4A# (step S410).

If none of temperature increase requests DMN1 to DMNN is output from battery ECU 4A# (NO in step S410), converter ECU 2A# moves to the normal control mode (step S420). Then, converter ECU 2A# returns to the initial processing.

It is noted that the "normal control mode" herein is not limited to a specific control mode, however, for example, a configuration where all converters are controlled in the voltage control mode, a configuration where all converters are controlled in the current control mode, or the like is preferable. In addition, as shown in FIG. 9 above, a configuration may be such that the control configuration according to the variation of the first embodiment of the present invention is further executed.

According to the variation of the second embodiment of the present invention, even if three or more converters and power storage units are included, an effect the same as in the second embodiment of the present invention described above can be achieved. Namely, among the plurality of power storage units constituting the power supply system, the temperature of the power storage units in the number smaller by one than the total number of the power storage units, at the maximum, can simultaneously be raised. Therefore, constraint concerning control of temperature increase of the power storage unit is relaxed, and temperature increase control of the power storage unit with higher degree of freedom can be realized.

In the first and second embodiments of the present invention and each variation, the configuration employing the drive force generation unit including two motor-generators has been described as an example of the load device, however, the number of motor-generators is not limited. In addition, the load device is not limited to the drive force generation unit generating the drive force of the vehicle, and the load device includes a load consuming electric power or any generator generating electric power.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system including a plurality of power storage units each configured to be capable of charge/discharge, comprising:
   a power line configured to allow supply/reception of electric power between a load device and said power supply system;
   a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation;
   actual power value obtaining means for obtaining, on said power line, an actual value of electric power supplied/received to/from said load device;
   first determination means for determining which of an allowable power total value, which is a total value of allowable power of said plurality of power storage units, and said actual power value, obtained by said actual power value obtaining means, is greater;
   first voltage conversion unit control means for setting one of said plurality of voltage conversion units to said voltage control mode and setting remaining voltage conversion units to said current control mode if said first determination means determines that said actual power value is smaller than said allowable power total value; and
   second voltage conversion unit control means for setting said plurality of voltage conversion units to said current control mode if said first determination means determines that said actual power value is equal to or larger than said allowable power total value.

2. The power supply system according to claim 1, further comprising:
   electric power fluctuation estimation means for estimating fluctuation of the electric power supplied/received to/from said load device; and
   third voltage conversion unit control means for switching the voltage conversion unit, set to said voltage control mode by said first voltage conversion unit control means, to said current control mode when said electric power fluctuation estimation means estimates that electric power fluctuation is smaller than a prescribed value even if said first determination means determines that said actual power value is smaller than said allowable power total value.

3. The power supply system according to claim 1, further comprising:
   second determination means for determining whether charge/discharge restriction is necessary, based on the allowable power of said plurality of power storage units; and
   third voltage conversion unit control means for setting said plurality of voltage conversion units to said current control mode if said second determination means determines that charge/discharge restriction is necessary.

4. The power supply system according to claim 1, wherein said current target value in said current control mode is set in accordance with a voltage value of the power storage unit such that said current target value does not exceed the allowable power, for each of said plurality of voltage conversion units.

5. The power supply system according to claim 1, further comprising:
   third determination means for determining power margin of said allowable power total value, for said actual power value; and
   third voltage conversion unit control means for stopping the voltage conversion operation in the voltage conversion unit corresponding to at least one power storage unit out of said plurality of power storage units, if said third determination means determines, in a control operation by said first voltage conversion unit control means, that said power margin is greater than the allowable power of said at least one power storage unit.

6. A power supply system including a plurality of power storage units each configured to be capable of charge/discharge, comprising:
   a power line configured to allow supply/reception of electric power between a load device and said power supply system;
   a plurality of voltage conversion units provided between said plurality of power storage units and said power line and each performing a voltage conversion operation between a corresponding power storage unit and said power line; and
   a control device; wherein
   each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation,
   said control device obtains, on said power line, an actual value of electric power supplied/received to/from said load device, determines which of an allowable power total value, which is a total value of allowable power of said plurality of power storage units, and obtained actual power value is greater, and sets one of said plurality of voltage conversion units to said voltage control mode and remaining voltage conversion units to said current control mode if it is determined that said actual power value is smaller than said allowable power total value, and sets said plurality of voltage conversion units to said current control mode if it is determined that said actual power value is equal to or larger than said allowable power total value.

7. A method of controlling a power supply system including a plurality of power storage units each configured to be capable of charge/discharge, a power line configured to allow supply/reception of electric power between a load device and said power supply system, and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining, on said power line, an actual value of the electric power supplied/received to/from said load device;

determining which of an allowable power total value, which is a total value of allowable power of said plurality of power storage units, and obtained actual power value is greater;

setting one of said plurality of voltage conversion units to said voltage control mode and setting remaining voltage conversion units to said current control mode if it is determined that said actual power value is smaller than said allowable power total value; and setting said plurality of voltage conversion units to said current control mode if it is determined that said actual power value is equal to or larger than said allowable power total value.

8. A vehicle comprising:

a power supply system having a plurality of power storage units each configured to be capable of charge/discharge; and a drive force generation unit generating drive force by receiving electric power supplied from said power supply system; and said power supply system including a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, actual power value obtaining means for obtaining, on said power line, an actual value of the electric power supplied/received to/from said drive force generation unit, first determination means for determining which of an allowable power total value, which is a total value of allowable power of said plurality of power storage units, and said actual power value, obtained by said actual power value obtaining means, is greater, first voltage conversion unit control means for setting one of said plurality of voltage conversion units to said voltage control mode and setting remaining voltage conversion units to said current control mode if said first determination means determines that said actual power value is smaller than said allowable power total value; and second voltage conversion unit control means for setting said plurality of voltage conversion units to said current control mode if said first determination means determines that said actual power value is equal to or larger than said allowable power total value.

9. The vehicle according to claim 8, wherein said drive force generation unit includes at least one electric power conversion unit configured to be able to convert the electric power supplied from said power supply system, and at least one rotating electric machine connected to corresponding said electric power conversion unit and configured to be able to generate said drive force.

10. The vehicle according to claim 8, wherein said power supply system further includes electric power fluctuation estimation means for estimating fluctuation of the electric power supplied/received to/from said drive force generation unit, and third voltage conversion unit control means for switching the voltage conversion unit, set to said voltage control mode by said first voltage conversion unit control means, to said current control mode when said electric power fluctuation estimation means estimates that electric power fluctuation is smaller than a prescribed value even if said first determination means determines that said actual power value is smaller than said allowable power total value.

11. The vehicle according to claim 8, wherein said power supply system further includes third determination means for determining whether charge/discharge restriction is necessary, based on the allowable power of said plurality of power storage units, and third voltage conversion unit control means for setting said plurality of voltage conversion units to said current control mode if said second determination means determines that charge/discharge restriction is necessary.

12. The vehicle according to claim 8, wherein said current target value in said current control mode is set in accordance with a voltage value of the power storage unit such that said current target value does not exceed the allowable power, for each of said plurality of voltage conversion units.

13. The vehicle according to claim 8, wherein said power supply system further includes third determination means for determining power margin of said allowable power total value, for said actual power value, and third voltage conversion unit control means for stopping the voltage conversion operation in the voltage conversion unit corresponding to at least one power storage unit out of said plurality of power storage units, if said third determination means determines, in a control operation by said first voltage conversion unit control means, that said power margin is greater than the allowable power of said at least one power storage unit.

14. A vehicle comprising:

a power supply system having a plurality of power storage units each configured to be capable of charge/discharge; and a drive force generation unit generating drive force by receiving electric power supplied from said power supply system; wherein said power supply system includes a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, and a control device, each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation, and said control device obtains, on said power line, an actual value of the electric power supplied/received to/from said drive force generation unit, determines which of an allowable power total value, which is a total value of allowable power of said plurality of power storage units, and obtained actual power value is greater, and sets one of said plurality of voltage conversion units to said voltage control mode and remaining voltage conversion units to said current control mode if it is determined that said actual power value is smaller than said allowable power total value, and sets said plurality of voltage conversion units to said current control mode if it is determined that said actual power value is equal to or larger than said allowable power total value.

15. A method of controlling a vehicle, said vehicle including a power supply system having a plurality of power storage units each configured to be capable of charge/discharge and a drive force generation unit generating drive force by receiving electric power supplied from said power supply system, said power supply system including a power line configured to allow supply/reception of electric power between said drive force generation unit and said power supply system and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining, on said power line, an actual value of the electric power supplied/received to/from said drive force generation unit;

determining which of an allowable power total value, which is a total value of allowable power of said plurality of power storage units, and obtained actual power value is greater;

setting one of said plurality of voltage conversion units to said voltage control mode and setting remaining voltage conversion units to said current control mode if it is determined that said actual power value is smaller than said allowable power total value; and setting said plurality of voltage conversion units to said current control mode if it is determined that said actual power value is equal to or larger than said allowable power total value.

16. A power supply system including a plurality of power storage units each configured to be capable of charge/discharge, comprising:

a power line configured to allow supply/reception of electric power between a load device and said power supply system;

a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation;

power storage unit temperature obtaining means for obtaining temperatures of said plurality of power storage units;

temperature determination means for determining whether each of the temperatures of said plurality of power storage units obtained by said power storage unit temperature obtaining means is lower than a corresponding temperature lower limit value;

first mode setting means for setting said voltage conversion unit, corresponding to said power storage unit of which temperature has been determined by said temperature determination means as lower than said temperature lower limit value, to said current control mode, and sets remaining said voltage conversion units to said voltage control mode; and second mode setting means for setting said plurality of voltage conversion units to either of said current control mode or said voltage control mode, if it is determined that said power storage unit of which temperature is lower than said temperature lower limit value does not exist, wherein said first mode setting means sets solely said voltage conversion unit corresponding to said power storage unit of higher priority to said current control mode, if it is determined that the temperature of all of said plurality of power storage units is lower than corresponding said temperature lower limit value.

17. A power supply system including a plurality of power storage units each configured to be capable of charge/discharge, comprising:

a power line configured to allow supply/reception of electric power between a load device and said power supply system, a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation;

power storage unit temperature obtaining means for obtaining temperatures of said plurality of power storage units;

temperature determination means for determining whether each of the temperatures of said plurality of power storage units obtained by said power storage unit temperature obtaining means is lower than a corresponding temperature lower limit value;

first mode setting means for setting said voltage conversion unit, corresponding to said power storage unit of which temperature has been determined by said temperature determination means as lower than said temperature lower limit value, to said current control mode, and sets remaining said voltage conversion units to said voltage control mode; and second mode setting means for setting said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality of voltage conversion units, and said current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

18. A power supply system including two power storage units each configured to be capable of charge/discharge, comprising:

a power line configured to allow supply/reception of electric power between a load device and said power supply system;

two voltage conversion units provided between said two power storage units and said power line and each performing a voltage conversion operation between a corresponding power storage unit of said two power storage units and said power line, each of said two voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation;

power storage unit temperature obtaining means for obtaining temperatures of said two power storage units;

temperature determination means for determining whether each of the temperatures of said two power storage units obtained by said power storage unit temperature obtaining means is lower than a corresponding temperature lower limit value;

first mode setting means for setting said voltage conversion unit, corresponding to said power storage unit of which temperature has been determined by said temperature determination means as lower than said temperature lower limit value, to said voltage control mode, and sets an other voltage conversion unit to said current control mode; and second mode setting means for setting said two voltage conversion units to either of said current control mode or said voltage control mode, if it is determined that said power storage unit of which temperature is lower than said temperature lower limit value does not exist, wherein said first mode setting means sets solely said voltage conversion unit corresponding to said power storage unit of higher priority to said current control mode, if it is determined that the temperature of all of said two power storage units is lower than corresponding said temperature lower limit value.

19. A power supply system including a plurality of power storage units each configured to be capable of charge/discharge, comprising:

a power line configured to allow supply/reception of electric power between a load device and said power supply system;

a plurality of voltage conversion units provided between said plurality of power storage units and said power line respectively and each performing a voltage conversion operation between a corresponding power storage unit and said power line; and a control device; wherein each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation, and said control device obtains temperatures of said plurality of power storage units, determines whether each of obtained temperatures of said plurality of power storage units is lower than a corresponding temperature lower limit value, and sets one of said voltage conversion units, corresponding to said power storage unit of which temperature has been determined as lower than said temperature lower limit value, to said current control mode, and sets remaining said voltage conversion units to said voltage control mode, and sets said plurality of voltage conversion units to either of said current control mode or said voltage control mode, if it is determined that said power storage unit of which temperature is lower than said temperature lower limit value does not exist, wherein said control device sets solely said voltage conversion unit corresponding to said power storage unit of higher priority to said current control mode, if it is determined that the temperature of all of said plurality of power storage units is lower than corresponding said temperature lower limit value.

20. A method of controlling a power supply system including a plurality of power storage units each configured to be capable of charge/discharge, a power line configured to allow supply/reception of electric power between a load device and said power supply system, and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining temperatures of said plurality of power storage units;

determining whether each of obtained temperatures of said plurality of power storage units is lower than a corresponding temperature lower limit value;

setting one of said plurality of voltage conversion units, corresponding to said power storage unit of which temperature has been determined as lower than said temperature lower limit value, to said current control mode, and setting remaining said voltage conversion units to said voltage control mode; and setting said plurality of voltage conversion units to either of said current control mode or said voltage control mode, if it is determined that said power storage unit of which temperature is lower than said temperature lower limit value does not exist, wherein said setting of one of said plurality of voltage conversion units sets solely said voltage conversion unit corresponding to said power storage unit of higher priority to said current control mode, if it is determined that the temperature of all said of plurality of power storage units is lower than corresponding said temperature lower limit value.

21. A vehicle comprising:

a power supply system having a plurality of power storage units each configured to be capable of charge/discharge; and a drive force generation unit generating drive force by receiving electric power supplied from said power supply system; and said power supply system including a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, power storage unit temperature obtaining means for obtaining temperatures of said plurality of power storage units, temperature determination means for determining whether each of the temperatures of said plurality of power storage units obtained by said power storage unit temperature obtaining means is lower than a corresponding temperature lower limit value, and first mode setting means for setting said voltage conversion unit, corresponding to said power storage unit of which temperature has been determined by said temperature determination means as lower than said temperature lower limit value, to said current control mode, and for setting remaining said voltage conversion units to said voltage control mode; and second mode setting means for setting said plurality of voltage conversion units to either of said current control mode or said voltage control mode, if it is determined that said power storage unit of which temperature is lower than said temperature lower limit value does not exist, wherein said first mode setting means sets solely said voltage conversion unit corresponding to said power storage unit of higher priority to said current control mode, if it is determined that the temperature of all of said plurality of power storage units is lower than corresponding said temperature lower limit value.

22. A vehicle comprising:

a power supply system having a plurality of power storage units each configured to be capable of charge/discharge; and a drive force generation unit generating drive force by receiving electric power supplied from said power supply system; and said power supply system including a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, power storage unit temperature obtaining means for obtaining temperatures of said plurality of power storage units, temperature determination means for determining whether each of the temperatures of said plurality of power storage units obtained by said power storage unit temperature obtaining means is lower than a corresponding temperature lower limit value, and first mode setting means for setting said voltage conversion unit, corresponding to said power storage unit of which temperature has been determined by said temperature determination means as lower than said temperature lower limit value, to said current control mode, and for setting remaining said voltage conversion units to said voltage control mode; and second mode setting means for setting said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality of voltage conversion units, and said current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

23. A vehicle comprising:

a power supply system having a plurality of power storage units each configured to be capable of charge/discharge; and a drive force generation unit generating drive force by receiving electric power supplied from said power supply system; wherein said power supply system includes a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, and a control device, each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation, and said control device obtains temperatures of said plurality of power storage units, determines whether each of obtained temperatures of said plurality of power storage units is lower than a corresponding temperature lower limit value, and sets one of said voltage conversion unit, corresponding to said power storage unit of which temperature has been determined as lower than said temperature lower limit value, to said current control mode, and sets remaining said voltage conversion units to said voltage control mode, and sets said plurality of voltage conversion units to either of said current control mode or said voltage control mode, if it is determined that said power storage unit of which temperature is lower than said temperature lower limit value does not exist, wherein said control device sets solely said voltage conversion unit corresponding to said power storage unit of higher priority to said current control mode, if it is determined that the temperature of all of said plurality of power storage units is lower than corresponding said temperature lower limit value.

24. A method of controlling a vehicle, said vehicle including a power supply system having a plurality of power storage units each configured to be capable of charge/discharge and a drive force generation unit generating drive force by receiving electric power supplied from said power supply system, said power supply system including a power line configured to allow supply/reception of electric power between said drive force generation unit and said power supply system and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining temperatures of said plurality of power storage units;

determining whether each of obtained temperatures of said plurality of power storage units is lower than a corresponding temperature lower limit value;

setting one of said voltage conversion units, corresponding to said power storage unit of which temperature has been determined as lower than said temperature lower limit value, to said current control mode, and setting remaining said voltage conversion units to said voltage control mode; and setting said plurality of voltage conversion units to either of said current control mode or said voltage control mode, if it is determined that said power storage unit of which temperature is lower than said temperature lower limit value does not exist, wherein said setting one of said voltage conversion units sets solely said voltage conversion unit corresponding to said power storage unit of higher priority to said current control mode, if it is determined that the temperature of all of said plurality of power storage units is lower than corresponding said temperature lower limit value.

25. A power supply system including two power storage units each configured to be capable of charge/discharge, comprising:

a power line configured to allow supply/reception of electric power between a load device and said power supply system;

two voltage conversion units provided between said two power storage units and said power line and each performing a voltage conversion operation between a corresponding power storage unit of said two power storage units and said power line, each of said two voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation;

power storage unit temperature obtaining means for obtaining temperatures of said two power storage units;

temperature determination means for determining whether each of the temperatures of said two power storage units obtained by said power storage unit temperature obtaining means is lower than a corresponding temperature lower limit value;

first mode setting means for setting said voltage conversion unit, corresponding to said power storage unit of which temperature has been determined by said temperature determination means as lower than said temperature lower limit value, to said voltage control mode, and sets an other voltage conversion unit to said current control mode; and second mode setting means for setting said two voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said two voltage conversion units, and said current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

26. A power supply system including a plurality of power storage units each configured to be capable of charge/discharge, comprising:

a power line configured to allow supply/reception of electric power between a load device and said power supply system;

a plurality of voltage conversion units provided between said plurality of power storage units and said power line respectively and each performing a voltage conversion operation between a corresponding power storage unit and said power line; and a control device; wherein each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation, and said control device obtains temperatures of said plurality of power storage units, determines whether each of obtained temperatures of said plurality of power storage units is lower than a corresponding temperature lower limit value, and sets one of said voltage conversion units, corresponding to said power storage unit of which temperature has been determined as lower than said temperature lower limit value, to said current control mode, and sets remaining said voltage conversion units to said voltage control mode, and sets said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality voltage conversion units, and said current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

27. A method of controlling a power supply system including a plurality of power storage units each configured to be capable of charge/discharge, a power line configured to allow supply/reception of electric power between a load device and said power supply system, and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining temperatures of said plurality of power storage units;

determining whether each of obtained temperatures of said plurality of power storage units is lower than a corresponding temperature lower limit value;

setting one of said plurality of voltage conversion units, corresponding to said power storage unit of which temperature has been determined as lower than said temperature lower limit value, to said current control mode, and setting remaining said voltage conversion units to said voltage control mode; and setting said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality voltage conversion units, and said current target value is decided based on predetermined charge/discharge characteristic indicating correspondence between a current value and a voltage value of the power storage unit in accordance with the temperature of the power storage unit, such that the voltage value of the power storage unit is not lower than a prescribed voltage lower limit value.

28. A vehicle comprising:

a power supply system having a plurality of power storage units each configured to be capable of charge/discharge; and a drive force generation unit generating drive force by receiving electric power supplied from said power supply system; wherein said power supply system includes a power line configured to allow supply/reception of electric power between said drive force generation unit and said power supply system, a plurality of voltage conversion units provided between said plurality of power storage units and said power line and each performing a voltage conversion operation between a corresponding power storage unit and said power line, and a control device, each of said plurality of voltage conversion units is set to any one of a voltage control mode in which a voltage value of said power line is controlled to attain a voltage target value and a current control mode in which a current value of said corresponding power storage unit is controlled to attain a current target value, to perform said voltage conversion operation, and said control device obtains temperatures of said plurality of power storage units, determines whether each of obtained temperatures of said plurality of power storage units is lower than a corresponding temperature lower limit value, and sets one of said voltage conversion unit, corresponding to said power storage unit of which temperature has been determined as lower than said temperature lower limit value, to said current control mode, and sets remaining said voltage conversion units to said voltage control mode, and sets said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality of voltage conversion units, and said current target value is decided based on predetermined charge/discharge characteristic indicating correspondence between a current value and a voltage value of power storage unit in accordance with the temperature of the power storage unit, such that the voltage value of the power storage unit is not lower than a prescribed voltage lower limit value.

29. A method of controlling a vehicle, said vehicle including a power supply system having a plurality of power storage units each configured to be capable of charge/discharge and a drive force generation unit generating drive force by receiving electric power supplied from said power supply system, said power supply system including a power line configured to allow supply/reception of electric power between said drive force generation unit and said power supply system and a plurality of voltage conversion units provided between said plurality of power storage units and said power line and each performing a voltage conversion operation between a corresponding power storage unit and said power line, each of said plurality of voltage conversion units being set to any one of a voltage control mode in which a voltage value of said power line is controlled to attain a voltage target value and a current control mode in which a current value of said corresponding power storage unit is controlled to attain a current target value, to perform said voltage conversion operation, comprising the steps of:

obtaining temperatures of said plurality of power storage units;

determining whether each of obtained temperatures of said plurality of power storage units is lower than a corresponding temperature lower limit value;

setting one of said voltage conversion units, corresponding to said power storage unit of which temperature has been determined as lower than said temperature lower limit value, to said current control mode, and setting remaining said voltage conversion units to said voltage control mode; and setting said plurality of voltage conversion units to either of said current control mode or said voltage control mode, if it is determined that said power storage unit of which temperature is lower than said temperature lower limit value does not exist, wherein said current target value in said current control mode is set in accordance with the obtained temperature of the power storage unit, for each of said plurality of voltage conversion units, and said current target value is decided based on predetermined charge/discharge characteristic indicating correspondence between a current value and a voltage value of power storage unit in accordance with the temperature of the power storage unit, such that the voltage value of the power storage unit is not lower than a prescribed voltage lower limit value.

* * * * *